US008562691B2

(12) United States Patent
Endo et al.

(10) Patent No.: US 8,562,691 B2
(45) Date of Patent: Oct. 22, 2013

(54) TRAINING DEVICE

(75) Inventors: Yosuke Endo, Wako (JP); Tetsuya Ido, Wako (JP); Ritsuo Hara, Wako (JP); Keishiro Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 444 days.

(21) Appl. No.: 12/852,722

(22) Filed: Aug. 9, 2010

(65) Prior Publication Data

US 2011/0033835 A1 Feb. 10, 2011

(30) Foreign Application Priority Data

Aug. 10, 2009 (JP) .................... 2009-186007
Aug. 10, 2009 (JP) .................... 2009-186008
Aug. 10, 2009 (JP) .................... 2009-186009

(51) Int. Cl.
*A61F 2/74* (2006.01)

(52) U.S. Cl.
USPC .............................. 623/27; 623/24

(58) Field of Classification Search
USPC ......... 600/587, 595; 601/5, 23, 33–35; 602/5, 602/16, 23–27; 607/43, 48–49; 700/245–264; 702/150; 703/11; 135/66–67; 434/247, 257; 623/24, 27, 623/34, 53; 382/103, 157, 190; 482/1–9, 482/51, 66–67, 69, 74–76, 900–902, 482/121–122, 124–125, 127, 131
See application file for complete search history.

(56) References Cited

U.S. PATENT DOCUMENTS 7,537,573 B2 * 5/2009 Horst ......................... 601/5
2006/0276728 A1 * 12/2006 Ashihara et al. ............. 601/5

FOREIGN PATENT DOCUMENTS

| JP | 2004-073649 | 3/2004 |
|----|-------------|--------|
| JP | 2004-329520 | 11/2004 |
| JP | 2004-331004 | 11/2004 |
| JP | 2006-334200 | 12/2006 |
| JP | 2007-054086 | 3/2007 |
| JP | 2007-061217 | 3/2007 |
| JP | 2007-330513 | 12/2007 |
| JP | 2008-055995 | 3/2008 |
| JP | 3143209 | 7/2008 |

* cited by examiner

*Primary Examiner* — Timothy A Musselman
(74) *Attorney, Agent, or Firm* — Rankin, Hill & Clark LLP

(57) ABSTRACT

A training device capable of converting kinetic energy of an agent into electric energy while applying to the agent a resistance force of a variation behavior appropriate to a motion behavior of the agent. According to the training device, a strength and a direction of a resistance force applied to the agent can be varied via a regenerative braking on a motor according to at least one of a variation behavior of a relative posture between an upper body and a leg of the agent and a temporal variation behavior of the relative posture therebetween.

42 Claims, 12 Drawing Sheets

TRAINING DEVICE

BACKGROUND OF THE INVENTION

1. Field of the Invention

The present invention relates to a training device transmitting a force generated from an actuator to the body of an agent through a mounting element.

2. Description of the Related Art

There has been disclosed a technology of converting kinetic energy of a body portion of an agent (human being) into electric energy through regenerative braking of a motor (for example, refer to Japanese Patent Laid-open No. 2007-054086).

However, in view of a walking motion behavior of the agent, it is possible that a force is applied inappropriately and/or uncomfortably by the regenerative braking to the body portion of the agent.

SUMMARY OF THE INVENTION

The present invention has been accomplished in view of the aforementioned problems, and it is therefore an object of the present invention to provide a training device capable of converting kinetic energy of an agent into electric energy while applying to the agent a resistance force of a variation behavior appropriate to a motion behavior of the agent.

The training device of the present invention is provided with a first mounting element mounted to an upper body of an agent, a second mounting element mounted to a leg thereof, an actuator and a controller configured to control the actuator and is configured to transmit a force generated from the actuator to the agent via the first mounting element and the second mounting element.

A first mode of the training device of the present invention is configured to operate selectively in an assist mode configured to apply an assist force to a relative motion between the upper body and the leg of the agent and a training mode configured to apply a resistance force to the relative motion between the upper body and the leg of the agent (first aspect of the present invention).

According to the training device of the present invention, according to the mode selection, it is possible to apply a force to the agent along the direction of the relative motion between the upper body and the leg (assist force) and a force to the agent reverse to the direction of the relative motion between the upper body and the leg (resistance force). Thereby, when the agent is performing a walking motion or the like involving the relative motion between the upper body and the leg thereof, the forces can be applied to the agent in various behaviors.

In the training device of the first aspect of the present invention, it is acceptable that the controller is configured to adjust at least one of the assist force and the resistance force as a function with a part of or the entire part of a posture variant denoting a relative posture of the leg with respect to the upper body of the agent and a temporal differential thereof served as a variant of the function (second aspect of the present invention).

According to the training device with the aforementioned configuration, the magnitude and the direction of a force applied to the agent can be varied according to at least one of the variation behavior of the relative posture between the upper body and the leg of the agent and the temporal variation behavior of the relative posture therebetween.

In the training device of the second aspect of the present invention, it is acceptable that the controller is configured to control the assist force according to a function having a variation property of approaching to zero as the posture variant approaches to the variant maximum value and approaching to the function minimum value as the posture variant approaches to a first assist reference value in a first assist domain satisfying conditions that the posture variant is equal to or greater than the first assist reference value, a posture variation velocity which is a first-order temporal differential of the posture variant is negative, and the posture variation velocity approaches to zero as the posture variant approaches to the variant maximum value, to control the assist force according to the function having a variation property of approaching to zero as the posture variant approaches to the variant minimum value and approaching to the function minimum value as the posture variant approaches to the first assist reference value in a second assist domain satisfying conditions that the posture variant is smaller than the first assist reference value, the posture variation velocity is negative, and the posture variation velocity approaches to zero as the posture variant approaches to the variant minimum value, to control the assist force according to the function having a variation property of approaching to zero as the posture variant approaches to the variant minimum value and approaching to the function maximum value as the posture variant approaches to a second assist reference value in a third assist domain satisfying conditions that the posture variant is smaller than the second assist reference value, the posture variation velocity is positive, and the posture variation velocity approaches to zero as the posture variant approaches to the variant minimum value, and to control the assist force according to the function having a variation property of approaching to zero as the posture variant approaches to the variant maximum value and approaching to the function maximum value as the posture variant approaches to the second assist reference value in a fourth assist domain satisfying conditions that the posture variant is equal to or greater than the second assist reference value, the posture variation velocity is positive, and the posture variation velocity approaches to zero as the posture variant approaches to the variant maximum value (third aspect of the present invention).

According to the training device with the aforementioned configuration, when the agent is performing a walking motion, the training device is controlled as the follows when a determination value of each of the posture variant and the posture variation velocity varies periodically from the first assist domain, the second assist domain, the third assist domain to the fourth assist domain. Note that a period when a determined value is contained in an ith (i=1-4) assist domain is defined as an ith assist period.

In a "first assist period", the assist force is controlled to decrease from zero to the minimum value thereof successively. In a "second assist period", the assist force is controlled to increase from the minimum value thereof to zero successively. In a "third assist period", the assist force is controlled to increase from zero to the maximum value thereof successively. In a "fourth assist period", the assist force is controlled to decrease from the maximum value thereof to zero successively.

Thereby, the assist force applied to the relative motion between the upper body and the leg when the agent is performing the walking motion can be applied to the agent in a variation behavior appropriate to the motion behavior of the agent denoted by the determination values of the posture variant and a posture variation angle.

In the training device of the third aspect of the present invention, it is acceptable that the controller is configured to control the assist force by the usage of an approximate expression of a curved line denoting the variation behavior of the assist force in a plane defined by the assist force and the posture variant, and determined values of the posture variant and the posture variation velocity (fourth aspect of the present invention).

According to the training device with the aforementioned configuration, the assist force applied to the agent can be adjusted to vary successively when the walking motion, the posture variant and the posture variation velocity are varying separately and successively.

In the training device of the second aspect of the present invention, it is acceptable that the controller is configured to control the resistance force according to a function having a variation property of approaching to zero as the posture variant approaches to the variant maximum value and approaching to the function maximum value as the posture variant approaches to a first training reference value in a first training domain satisfying conditions that the posture variant is equal to or greater than the first training reference value, a posture variation velocity which is a first-order temporal differential of the posture variant is negative, and the posture variation velocity approaches to zero as the posture variant approaches to the variant maximum value, to control the resistance force according to the function having a variation property of approaching to zero as the posture variant approaches to the variant minimum value and approaching to the function maximum value as the posture variant approaches to the first training reference value in a second training domain satisfying conditions that the posture variant is smaller than the first training reference value, the posture variation velocity is negative, and the posture variation velocity approaches to zero as the posture variant approaches to the variant minimum value, to control the resistance force according to the function having a variation property of approaching to zero as the posture variant approaches to the variant minimum value and approaching to the function minimum value as the posture variant approaches to a second training reference value in a third training domain satisfying conditions that the posture variant is smaller than the second assist reference value, the posture variation velocity is positive, and the posture variation velocity approaches to zero as the posture variant approaches to the variant minimum value, and to control the resistance force according to the function having a variation property of approaching to zero as the posture variant approaches to the variant maximum value and approaching to the function minimum value as the posture variant approaches to the second training reference value in a fourth training domain satisfying conditions that the posture variant is equal to or greater than the second training reference value, the posture variation velocity is positive, and the posture variation velocity approaches to zero as the posture variant approaches to the variant maximum value (fifth aspect of the present invention).

According to the training device with the aforementioned configuration, when the agent is performing a walking motion, the training device is controlled as the follows when a determination value of each of the posture variant and the posture variation velocity transmits repeatedly in the order of the first training domain, the second training domain, the third training domain and the fourth training domain. Note that a period when a determined value is contained in an ith (i=1-4) training domain is defined as an ith training period.

In a "first training period", the resistance force is controlled to increase from zero to the maximum value thereof successively. In a "second training period", the resistance force is controlled to decrease from the maximum value thereof to zero successively. In a "third training period", the resistance force is controlled to decrease from zero to the minimum value thereof successively. In a "fourth training period", the resistance force is controlled to increase from the minimum value thereof to zero successively.

Thereby, the resistance force applied to the relative motion between the upper body and the leg when the agent is performing the walking motion can be applied to the agent in a variation behavior appropriate to the motion behavior of the agent denoted by the determination values of the posture variant and a posture variation angle.

In the training device of the fifth aspect of the present invention, it is acceptable that the controller is configured to control the resistance force by the usage of an approximate expression of a curved line denoting the variation behavior of the resistance force in a plane defined by the resistance force and the posture variant, and determined values of the posture variant and the posture variation velocity (sixth aspect of the present invention).

According to the training device with the aforementioned configuration, the resistance force applied to the agent can be adjusted to vary successively when the walking motion, the posture variant and the posture variation velocity are varying separately and successively.

In the training device of the first aspect of the present invention, it is acceptable that the controller is configured to apply the force generated from the actuator to the agent as either the assist force or the resistance force by controlling a phase difference of the force applied to the agent with respect to the posture variant denoting a relative posture of the leg with respect to the upper body of the agent (seventh aspect of the present invention).

In the training device of the first aspect of the present invention, it is acceptable that the controller is configured to determine whether the leg of the agent is a standing leg or a free leg, and to control the actuator to differentiate respectively the variation behaviors of the assist force and the resistance force according to the determination result (eighth aspect of the present invention).

According to the training device with the aforementioned configurations, the variation behaviors of the assist force and the resistance force with respect to the relative motion between the upper body and the leg thereof can be differentiated respectively according to whether the leg of the agent is a standing leg (a leg is standing on the floor) or a free leg (a leg is leaving off the floor).

In the training device of the eighth aspect of the present invention, it is acceptable that the controller is configured to control the actuator to increase the assist force and the resistance force when it is determined that the leg of the agent is a standing leg greater than the assist force and the resistance force when it is determined that the leg of the agent is a free leg, respectively (ninth aspect of the present invention).

According to the training device with the aforementioned configuration, the magnitude of the assist force and the resistance force applied to the relative motion between the upper body and the leg thereof can be differentiated respectively whether the leg of the agent is a standing leg or a free leg. Here, the magnitude of the force means that a magnitude of a force under identical conditions except factors of a standing leg state and a free leg state.

In the training device of the first aspect of the present invention, it is acceptable that the controller is configured to recognize a posture of a walking surface where the agent walks, and to control the actuator to differentiate respectively the variation behaviors of the assist force and the resistance force according to different recognition results (tenth aspect of the present invention).

In the training device of the tenth aspect of the present invention, it is acceptable that the controller is configured to control the actuator to increase the assist force when it is recognized that the posture of the walking surface is an ascending inclination posture greater than that when it is recognized that the posture of the walking surface is a flat posture or a descending inclination posture, and to control the actuator to increase the assist force when it is recognized that the posture of the walking surface is a flat posture greater than that when it is recognized that the posture of the walking surface is a descending inclination posture (eleventh aspect of the present invention).

In the training device of the tenth aspect of the present invention, it is acceptable that the controller is configured to control the actuator to increase the resistance force when it is recognized that the posture of the walking surface is a descending inclination posture greater than that when it is recognized that the posture of the walking surface is a flat posture or an ascending inclination posture, and to control the actuator to increase the resistance force when it is recognized that the posture of the walking surface is a flat posture greater than that when it is recognized that the posture of the walking surface is an ascending inclination posture (twelfth aspect of the present invention).

According to the training device with the aforementioned configurations, the resistance force applied to the agent can be adjusted appropriately in view of the magnitude of forces needed to be applied to the relative walking motion between the upper body and the leg according to the posture of the ground surface or floor surface (walking surface) where the agent is walking.

In the training device of the first aspect of the present invention, it is acceptable that the controller is configured to control the actuator to increase the assist force from zero continuously and return it back to zero thereafter from an initial time of the assist mode to an end time thereof, and control the actuator to increase the resistance force from zero continuously and return it back to zero thereafter from an initial time of the training mode to an end time thereof (thirteenth aspect of the present invention).

In the training device of the first aspect of the present invention, it is acceptable that the training device is further provided with a first interface configured to enable the agent to select one mode from the assist mode and the training mode, wherein the controller is configured to control the actuator according to the one mode of the assist mode and the training mode selected according to a signal output from the first interface corresponded to the selection by the agent (fourteenth aspect of the present invention).

According to the training device with the aforementioned configuration, operation mode can be switched between the assist mode and the training mode according to the wishes of the agent. Thereby, when the agent is performing a walking motion or the like involving the relative motion between the upper body and the leg thereof, forces can be applied to the agent in various behaviors reflecting the wishes of the agent.

In the training device of the first aspect of the present invention, it is acceptable that the training device is further provided with a second interface configured to enable the agent to select one mode as an operation mode from a plurality of assist modes with the assist force having different variation behaviors under identical conditions, wherein the controller is configured to control the actuator according to the one mode of the plurality of assist modes selected according to a signal output from the second interface corresponded to the selection by the agent (fifteenth aspect of the present invention).

According to the training device with the aforementioned configuration, one assist mode can be switched from a plurality of assist modes according to the wishes of the agent. Thereby, when the agent is performing a walking motion or the like involving the relative motion between the upper body and the leg thereof, the assist force can be applied to the agent in various behaviors reflecting the wishes of the agent.

In the training device of the first aspect of the present invention, it is acceptable that the training device is further provided with a third interface configured to enable the agent to select one mode as an operation mode from a plurality of training modes with the resistance force having different variation behaviors under identical conditions, wherein the controller is configured to control the actuator according to the one mode of the plurality of training modes selected according to a signal output from the third interface corresponded to the selection by the agent (sixteenth aspect of the present invention).

According to the training device with the aforementioned configuration, one training mode can be switched from a plurality of training modes according to the wishes of the agent. Thereby, when the agent is performing a walking motion or the like involving the relative motion between the upper body and the leg thereof, the resistance force can be applied to the agent in various behaviors reflecting the wishes of the agent.

In the training device of the first aspect of the present invention, it is acceptable that the controller is configured to determine the degree of fatigue of the agent and switch between the assist mode and the training mode according to the determination result (seventeenth aspect of the present invention).

According to the training device with the aforementioned configuration, the assist force applied to the agent with respect to the direction of the relative motion between the upper body and the leg thereof and the resistance force applied to the agent with respect to the direction of the relative motion between the upper body and the leg thereof can be realized according to the degree of fatigue.

In the training device of the first aspect of the present invention, it is acceptable that the actuator is provided with a motor and a reduction mechanism, the assist force and the resistance force are transmitted respectively to the agent via an output shaft of the motor and the reduction mechanism, and the controller is configured to adjust the assist force and the resistance force respectively through changing a reduction ratio of the reduction mechanism (eighteenth aspect of the present invention).

According to the training device with the aforementioned configuration, the assist force and the resistance force can be applied to the agent with different magnitude respectively through adjusting the reduction ratio of the reduction mechanism.

In the training device of the first aspect of the present invention, it is acceptable that the training device is further provided with an electric energy storing system, wherein the actuator is provided with a motor, the resistance force is transmitted to the agent via regenerative braking or friction of the motor, and the electric energy generated from the regenerative braking of the motor is stored in the electric energy storing system (nineteenth aspect of the present invention).

According to the training device with the aforementioned configuration, the variation behaviors of the resistance force applied to the agent can be differentiated according to different mechanisms of the friction and the regenerative braking of the motor. The electric energy generated by the regenerative braking of the motor can be stored in the electric energy storing system.

In the training device of the nineteenth aspect of the present invention, it is acceptable that a connection terminal for supplying electric energy to external electronic equipment from the electric energy storing system is provided (twentieth aspect of the present invention).

According to the training device with the aforementioned configuration, the electric energy which has been generated by the regenerative braking of the motor as mentioned above and has been stored in the electric energy storing system can be used by the external electronic equipment.

In the training device of the first aspect of the present invention, it is acceptable that the controller is configured to determine at least one of a walking cycle, a footstep, a walking frequency and a walking ratio of the agent as a walking state variant and control the actuator to match a determined value of the walking state variant with a desired value (twenty-first aspect of the present invention).

According to the training device with the aforementioned configuration, when the agent is performing a walking motion involving the relative motion between the upper body and the leg thereof, the forces can be made to apply to the agent in various behaviors, and the walking behavior can be made to approach the desired behavior.

A training device of a second mode of the present invention is configured to operate according to a hybrid mode mixed with an assist period in which an assist force is applied to a relative motion between the upper body and the leg of the agent and a training, period in which a resistance force is applied to the relative motion between the upper body and the leg of the agent (twenty-second aspect of the present invention).

According to the training device of the twenty-second aspect of the present invention, it is possible to apply a force to the agent along the direction of the relative motion between the upper body and the leg (assist force) and a force to the agent reverse to the direction of the relative motion between the upper body and the leg (resistance force). Thereby, when the agent is performing a walking motion or the like involving the relative motion between the upper body and the leg thereof, the forces can be applied to the agent in various behaviors.

In the training device of the twenty-second aspect of the present invention, it is acceptable that the controller is configured to adjust at least one of the assist force and the resistance force as a function with a part of or the entire part of a posture variant denoting a relative posture of the leg with respect to the upper body of the agent and a temporal differential thereof served as a variant of the function (twenty-third aspect of the present invention).

According to the training device with the aforementioned configuration, the magnitude and the direction of a force applied to the agent can be varied according to at least one of the variation behavior of the relative posture between the upper body and the leg of the agent and the temporal variation behavior of the relative posture therebetween.

In the training device of the twenty-third aspect of the present invention, it is acceptable that the controller is configured to control the assist force according to a function having a variation property of approaching to zero as the posture variant approaches to a first hybrid reference value and approaching to the function maximum value as the posture variant approaches to a second hybrid reference value in a first hybrid domain satisfying conditions that the posture variant is equal to or greater than the first hybrid reference value but smaller than the second hybrid reference value, and a posture variation velocity which is a first-order temporal differential of the posture variant is positive, to control the assist force according to the function having a variation property of approaching to the function maximum value as the posture variant approaches to the second hybrid reference value in a first assist domain satisfying conditions that the posture variant is equal to or greater than the second hybrid reference value and the posture variation velocity is positive and control the resistance force according to the function having a variation property of approaching to zero as the posture variant approaches to a third hybrid reference value in a first training domain satisfying conditions that the posture variant is equal to or greater than the third hybrid reference value and the posture variation velocity is negative, wherein the first assist domain and the first training domain are contained in a second hybrid domain, to control the assist force according to the function having a variation property of approaching to zero as the posture variant approaches to the third hybrid reference value and approaching to the function minimum value as the posture variant approaches to a fourth hybrid reference value in a third hybrid domain satisfying conditions that the posture variant is equal to or greater than the fourth hybrid reference value but smaller than the third hybrid reference value, and the posture variation velocity is negative, and to control the assist force according to the function having a variation property of approaching to the function minimum value as the posture variant approaches to the fourth hybrid reference value in a second assist domain satisfying conditions that the posture variant is smaller than the fourth hybrid reference value and the posture variation velocity is negative and control the resistance force according to the function having a variation property of approaching to zero as the posture variant approaches to a first hybrid reference value in a second training domain satisfying conditions that the posture variant is smaller than the first hybrid reference value and the posture variation velocity is positive, wherein the second assist domain and the second training domain are contained in a fourth hybrid domain (twenty-fourth aspect of the present invention).

According to the training device with the aforementioned configuration, when the agent is performing a walking motion, the training device is controlled as the follows when a determination value of each of the posture variant and the posture variation velocity transmits repeatedly in the order of the first hybrid domain, the second hybrid domain, the third hybrid domain and the fourth hybrid assist domain. Note that a period when a determined value is contained in an ith (i=1-4) hybrid domain is defined as an ith hybrid period.

In a "first hybrid period", a force applied to the agent (assist force) is controlled to increase from zero to the maximum value thereof successively. In a "second hybrid period", the force is controlled to decrease from the maximum value thereof to zero successively. In the second hybrid period, the force functions as the assist force in the early phase and as the resistance force in the late phase. In a "third hybrid period", the force (assist force) is controlled to decrease from zero to the minimum value thereof successively. In a "fourth hybrid period", the force is controlled to increase from the minimum value thereof to zero successively. In the fourth hybrid period, the force functions as the assist force in the early phase and as the resistance force in the late phase.

Thereby, the assist force or the resistance force applied to the relative motion between the upper body and the leg when the agent is performing the walking motion can be applied to the agent in a variation behavior appropriate to the motion behavior of the agent denoted by the determination values of the posture variant and the posture variation angle.

In the training device of the twenty-fourth aspect of the present invention, it is acceptable that the controller is configured to control the assist force and the resistance force respectively by the usage of an approximate expression of a curved line denoting the variation behavior of a force applied to the agent by the actuator in a plane defined by the force and the posture variant, and determined values of the posture variant and the posture variation velocity (twenty-fifth aspect of the present invention).

According to the training device with the aforementioned configuration, the force applied to the agent can be adjusted to vary successively when the walking motion, the posture variant and the posture variation velocity are varying separately and successively.

In the training device of the twenty-second aspect of the present invention, it is acceptable that the controller is configured to control the actuator to operate selectively in an assist mode configured to apply constantly an assist force to a relative motion between the upper body and the leg of the agent, a training mode configured to apply constantly a resistance force to the relative motion between the upper body and the leg of the agent, and the hybrid mode (twenty-sixth aspect of the present invention).

According to the training device of the present invention, according to the mode selection, it is possible to apply a force to the agent along the direction of the relative motion between the upper body and the leg (assist force) and a force to the agent reverse to the direction of the relative motion between the upper body and the leg (resistance force). Thereby, when the agent is performing a walking motion or the like involving the relative motion between the upper body and the leg thereof, the forces can be applied to the agent in various behaviors.

In the training device of the twenty-sixth aspect of the present invention, it is acceptable that the controller is configured to determine the degree of fatigue of the agent and switch among the assist mode, the training mode and the hybrid mode according to the determination result (twenty-seventh aspect of the present invention).

According to the training device with the aforementioned configuration, the assist force applied to the agent with respect to the direction of the relative motion between the upper body and the leg thereof and the resistance force applied to the agent with respect to reverse to the direction of the relative motion between the upper body and the leg thereof can be realized according to the degree of fatigue.

In the training device of the twenty-sixth aspect of the present invention, it is acceptable that the training device is further provided with a first interface configured to enable the agent to select one mode from the assist mode, the training mode and the hybrid mode, wherein the controller is configured to control the actuator according to the one mode of the assist mode, the training mode and the hybrid mode selected according to a signal output from the first interface corresponded to the selection by the agent (twenty-eighth aspect of the present invention).

According to the training device with the aforementioned configuration, the operation mode can be switched among the assist mode, the training mode and the hybrid mode according to the wishes of the agent. Thereby, when the agent is performing a walking motion or the like involving the relative motion between the upper body and the leg thereof, forces can be applied to the agent in various behaviors reflecting the wishes of the agent.

In the training device of the twenty-second aspect of the present invention, it is acceptable that the training device is further provided with a second interface configured to enable the agent to select one mode as an operation mode from a plurality of hybrid modes with the assist mode and the training mode mixed with different rates under identical conditions, wherein the controller is configured to control the actuator according to the one mode of the plurality of hybrid modes selected according to a signal output from the second interface corresponded to the selection by the agent (twenty-ninth aspect of the present invention).

According to the training device with the aforementioned configuration, a plurality of assist modes can be switched from one hybrid mode to another according to the wishes of the agent. Thereby, when the agent is performing a walking motion or the like involving the relative motion between the upper body and the leg thereof, the assist force and the resistance force can be applied respectively to the agent in various behaviors reflecting the wishes of the agent.

In the training device of the twenty-second aspect of the present invention, it is acceptable that the controller is configured to apply the force generated from the actuator to the agent as either the assist force or the resistance force by controlling a phase difference of the force applied to the agent with respect to the posture variant denoting a relative posture of the leg with respect to the upper body of the agent (thirtieth aspect of the present invention).

In the training device of the twenty-second aspect of the present invention, it is acceptable that the controller is configured to determine whether the leg of the agent is a standing leg or a free leg, and to control the actuator to differentiate respectively the variation behaviors of the assist force and the resistance force according to the determination result (thirty-first aspect of the present invention).

According to the training device with the aforementioned configurations, the variation behaviors of the assist force and the resistance force with respect to the relative motion between the upper body and the leg thereof can be differentiated respectively according to whether the leg of the agent is a standing leg (a leg is standing on the floor) or a free leg (a leg is leaving off the floor).

In the training device of the thirty-first aspect of the present invention, it is acceptable that the controller is configured to control the actuator to increase the assist force and the resistance force when it is determined that the leg of the agent is a standing leg greater than the assist force and the resistance force when it is determined that the leg of the agent is a free leg, respectively (thirty-second aspect of the present invention).

According to the training device with the aforementioned configuration, the magnitude of the assist force and the resistance force applied to the relative motion between the upper body and the leg thereof can be differentiated respectively whether the leg of the agent is a standing leg or a free leg. Herein, the magnitude of a force means that the magnitude of a force in a situation where the other factors are identical except that the standing leg and the free leg are different.

In the training device of the twenty-second aspect of the present invention, it is acceptable that the controller is configured to recognize a posture of a walking surface where the agent walks, and to control the actuator to differentiate respectively the variation behaviors of the assist force and the resistance force according to different recognition results (thirty-third aspect of the present invention).

In the training device of the thirty-third aspect of the present invention, it is acceptable that the controller is configured to control the actuator to increase the assist force when it is recognized that the posture of the walking surface is an ascending inclination posture greater than that when it is recognized that the posture of the walking surface is a flat posture or a descending inclination posture, and to control the actuator to increase the assist force when it is recognized that the posture of the walking surface is a flat posture greater than that when it is recognized that the posture of the walking surface is a descending inclination posture (thirty-fourth aspect of the present invention).

In the training device of the thirty-third aspect of the present invention, it is acceptable that the controller is configured to control the actuator to increase the resistance force when it is recognized that the posture of the walking surface is a descending inclination posture greater than that when it is recognized that the posture of the walking surface is a flat posture or an ascending inclination posture, and to control the actuator to increase the resistance force when it is recognized that the posture of the walking surface is a flat posture greater than that when it is recognized that the posture of the walking surface is an ascending inclination posture (thirty-fifth aspect of the present invention).

According to the training device with the aforementioned configurations, the variation behaviors of the assist force and the resistance force applied respectively to the relative motion between the upper body and the leg of the agent can be differentiated appropriately according to the posture of the ground surface or floor surface (walking surface) where the agent is walking.

In the training device of the twenty-second aspect of the present invention, it is acceptable that the actuator is provided with a motor and a reduction mechanism, the assist force and the resistance force are transmitted respectively to the agent via an output shaft of the motor and the reduction mechanism, and the controller is configured to adjust the assist force and the resistance force respectively through changing a reduction ratio of the reduction mechanism (thirty-sixth aspect of the present invention).

According to the training device with the aforementioned configuration, the assist force and the resistance force can be applied to the agent with different magnitude respectively through adjusting the reduction ratio of the reduction mechanism.

In the training device of the twenty-second aspect of the present invention, it is acceptable that the training device is further provided with an electric energy storing system, the actuator is provided with a motor, the resistance force is transmitted to the agent via regenerative braking or friction of the motor, and the electric energy generated from the regenerative braking of the motor is stored in the electric energy storing system (thirty-seventh aspect of the present invention).

According to the training device with the aforementioned configuration, the variation behaviors of the resistance force applied to the agent can be differentiated according to different mechanisms of the friction and the regenerative braking of the motor. The electric energy generated by the regenerative braking of the motor can be stored in the electric energy storing system.

In the training device of the thirty-seventh aspect of the present invention, it is acceptable that the training device is further provided with a connection terminal for supplying electric energy to an external electronic equipment from the electric energy storing system (thirty-eight aspect of the present invention).

According to the training device with the aforementioned configuration, the electric energy which has been generated by the regenerative braking of the motor as mentioned above and has been stored in the electric energy storing system can be used by the external electronic equipment.

In the training device of the twenty-second aspect of the present invention, it is acceptable that the controller is configured to determine at least one of a walking cycle, a footstep, a walking frequency and a walking ratio of the agent as a walking state variant and control the actuator to match a determined value of the walking state variant with a desired value (thirty-ninth aspect of the present invention).

According to the training device with the aforementioned configuration, when the agent is performing a walking motion involving the relative motion between the upper body and the leg thereof, the forces can be made to apply to the agent in various behaviors, and the walking behavior can be made to approach the desired behavior.

A third mode of the training device of the present invention is further provided with an electric energy storing system, wherein the actuator is provided with a motor, a resistance force is applied to a relative motion between the upper body and the leg of the agent via regenerative braking of the agent, the controller is configured to adjust the resistance force as a function with a part of or the entire part of a posture variant denoting a relative posture of the leg with respect to the upper body of the agent and a temporal differential thereof served as a variant of the function, and the electric energy generated from the regenerative braking of the motor is stored in the electric energy storing system (fortieth aspect of the present invention).

According to the training device of the fortieth aspect of the present invention, the magnitude and the direction of the resistance force applied to the agent can be varied via the regenerative braking of the motor according to at least one of the variation behavior of the relative posture between the upper body and the leg of the agent and the temporal variation behavior of the relative posture therebetween. Thereby, the kinetic energy of the agent can be converted into the electric energy by the regenerative braking of the motor while a resistance force is being applied to the agent appropriate to the walking motion behavior denoted by the relative posture and the like of the agent.

In the training device of the fortieth aspect of the present invention, it is acceptable that the controller is configured to determine whether the leg of the agent is a standing leg or a free leg, and to control the actuator to differentiate a variation behavior of the resistance force according to the determination result (forty-first aspect of the present invention).

According to the training device with the aforementioned configuration, the variation behavior of the assist force and the resistance force applied to the relative motion between the upper body and the leg thereof can be differentiated respectively whether the leg of the agent is a standing leg (a leg standing on the floor) or a free leg (a leg elevated from the floor). Thereby, the kinetic energy of the agent can be converted into the electric energy by the regenerative braking of the motor while a resistance force is being applied to the agent appropriate to the walking motion behavior denoted by a standing leg and a free leg of the agent respectively.

In the training device of the forty-first aspect of the present invention, it is acceptable that the controller is configured to control the actuator to increase the resistance three when it is determined that the leg of the agent is a standing leg greater than the resistance force when it is determined that the leg of the agent is a free leg (forty-second aspect of the present invention).

According to the training device with the aforementioned configuration, the magnitude of the resistance force, namely the amount of electric energy generated by the regenerative braking can be adjusted in consideration of the difference between the magnitude of the kinetic energy used to vary the relative posture between the upper body and the leg of the agent when the leg is a standing leg and the magnitude of the kinetic energy used to vary the relative posture between the upper body and the leg of the agent when the leg is a free leg. Specifically, the kinetic energy needed to vary the relative posture between the upper body and the leg becomes greater due to the translation force or the inertial force of the upper body when the leg is a standing leg than that when the leg is a free leg. Thereby, when the leg is a standing leg, the resistance force applied to the agent is increased to generate more electric energy. On the contrary, when the leg is a free leg, the force applied to the agent is decreased so that the generated electric energy becomes less. Accordingly, the kinetic energy of the agent can be converted into the electric energy by the regenerative braking of the motor while a resistance force is being applied to the agent appropriate to the walking motion behavior denoted by a standing leg and a free leg of the agent respectively as mentioned above.

In the training device of the fortieth aspect of the present invention, it is acceptable that is configured to recognize a posture of a walking surface where the agent walks, and to control the actuator to differentiate the variation behavior of the resistance force according to different recognition results (forty-third aspect of the present invention).

According to the training device with the aforementioned configuration, the variation behaviors of the resistance force applied to the relative motion between the upper body and the leg of the agent, namely the variation behavior of the electric energy generated by the regenerative braking can be adjusted appropriately according to the posture of the ground surface or floor surface (walking surface) where the agent is walking.

In the training device of the forty-third aspect of the present invention, it is acceptable that the controller is configured to control the actuator to increase the resistance force when it is recognized that the posture of the walking surface is a descending inclination posture greater than that when it is recognized that the posture of the walking surface is a flat posture or an ascending inclination posture, and to control the actuator to increase the resistance force when it is recognized that the posture of the walking surface is a flat posture greater than that when it is recognized that the posture of the walking surface is an ascending inclination posture (forty-fourth aspect of the present invention).

According to the training device with the aforementioned configuration, the resistance force applied to the agent can be adjusted appropriately in view of the magnitude of forces needed to be applied to the relative walking motion between the upper body and the leg according to the posture of the ground surface or floor surface (walking surface) where the agent is walking. Accordingly, the kinetic energy of the agent can be converted into the electric energy by the regenerative braking of the motor while a resistance force is being applied to the agent appropriately in view of the posture of the surface where the agent is walking.

In the training device of the fortieth aspect of the present invention, it is acceptable that the training device is further provided with a connection terminal for supplying electric energy to an external electronic equipment from the electric energy storing system (forty-fifth aspect of the present invention).

According to the training device with the aforementioned configuration, the electric energy which has been generated by the regenerative braking of the motor as mentioned above and has been stored in the electric energy storing system can be used by the external electronic equipment.

DETAILED DESCRIPTION OF THE PREFERRED EMBODIMENTS

Hereinafter, an embodiment of a training device of the present invention will be described in detail with reference to the drawings.

(Configuration of Training Device)

A configuration of a training device according to one embodiment of the present invention will be described.

Figure 1:
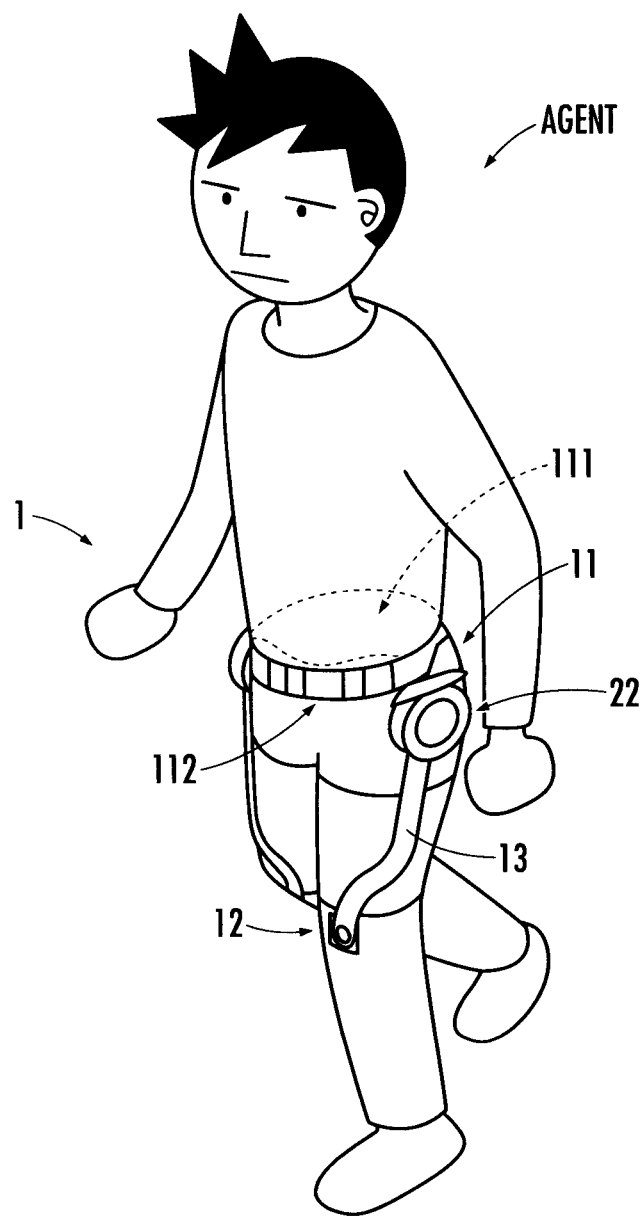
FIG. 1 is an explanatory diagram illustrating a training device of the present invention.
Figure 2:
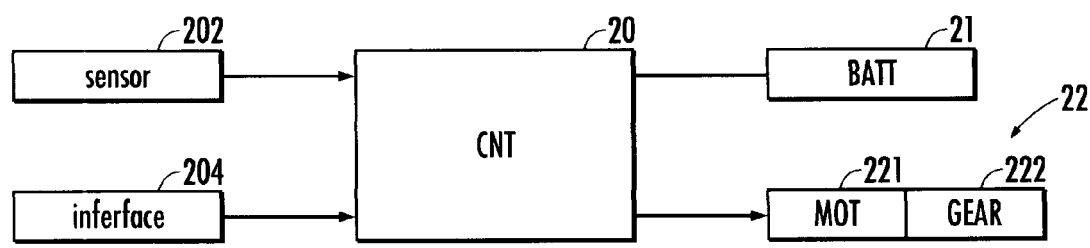
FIG. 2 is a block diagram illustrating a configuration of a controller provided in the training device of the present invention.

The training device 1 illustrated in FIG. 1 is provided with a first mounting element 11, a second mounting element 12 and an actuator 22. As illustrated in FIG. 2, the training device 1 is further provided with a state sensor 202, an operation interface 204, a controller 20, and a battery 21.

The first mounting element 11 is provided with a waist supporter 111 pushed toward the rear side of the waist of an agent (human) for supporting the waist thereof and a band 112 wrapped around the abdomen for fixing the waist supporter 111 at the waist. The waist supporter 111 is made of, for example, flexible resin with adequate hardness. Lower end portions at both lateral sides of the waist supporter 111 are attached with the actuator 22 having a degree of rotation around the roll axis, respectively.

The second mounting element 12 is provided with a band wrapped around the thigh of a leg of the agent. A link member 13 having a degree of rotation freedom around the roll axis is attached to the second mounting element 12 at the front side of the thigh for transmitting an output from the actuator 22 to the second mounting element 12. The link member 13 is made of hard resin and is formed into a curved shape by extending from each lateral outer side of the waist of the agent toward the front side of each thigh thereof with a curvature.

The controller 20 is composed of a computer (provided with a CPU, a ROM, a RAM, an I/O circuit, an A/D converting circuit and the like) built in the waist supporter 111 of the first mounting element 11. The controller 20 performs arithmetic processing on output signals from the state sensor 202 and output signals from the interface 204 according to a program retrieved from a memory where appropriate.

Thereby, the controller 20 controls the charging and discharging of the battery 21 and the operation of the actuator 22.

The battery 21 is also built in the waist supporter 111 of the first mounting element 11. The battery 21 serves as a power source for supplying electric power to the controller 20 and the actuator 22, respectively. The battery 21, together with an inverter (not shown), constitutes an electric power storing system which accepts electric energy generated by a motor 221, a component of the actuator 22, via the inverter and stores the electric energy therein.

The actuator 22 is provided with the motor 221 and a reduction mechanism 222. The operation of the motor 221 and the reduction ratio of the reduction mechanism 222 are controlled respectively by the controller 20. An output from the motor 221 after processed by the reduction mechanism 222 is equivalent to an output from the actuator 22. The output from the actuator 22 is transmitted to the waist of the agent via the first mounting element 11 and to the leg (directly to the thigh) of the agent's leg via the link member 13 and the second mounting element 12.

The state sensor 202 is configured to output signals in relation to various states of the agent. For example, a rotary encoder disposed at each of the two lateral sides of the waist of the agent for outputting signals according to relative angles between the waist and the thigh (leg) of the agent (hereinafter, referred to as "leg angle") falls under the state sensor 202. Furthermore, when a rotary angle of the motor constituting the actuator 22 is used as the basis for calculating the leg angle, a hall element disposed in the motor for outputting a signal in relation to the rotary angle may be adopted as the state sensor 202.

The interface 204 is configured to output signals according to a specific mode selected by the agent. A manual mode selecting button, a mode selecting touch button, or a voice recognition device disposed in the first mounting element 11 falls under the interface 204.

(Functions of Training Device)

The functions of the training device with the aforementioned configuration will be described.

When an ON/OFF switch (not shown) is switched from OFF to ON, the electric power is supplied from the battery 21 to the controller 20. The controller 20 retrieves output signals from the rotary encoder or the hall element serving as the state sensor 202 every sampling period or every arithmetic period, and calculates the leg angle $\phi$ of the agent and a first order temporal differential thereof as a leg angular velocity $\phi'$.

Figure 5:
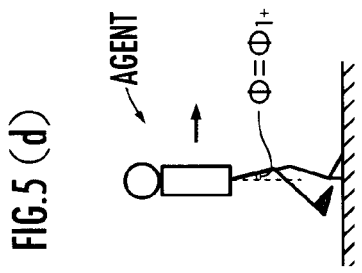
FIG. 5($a$)-FIG. 5($d$) are illustrative diagrams related to variation behaviors of a walking motion of an agent.
Figure 5:
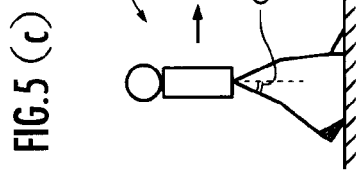
Figure 5:
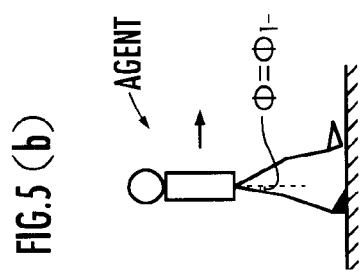
Figure 5:
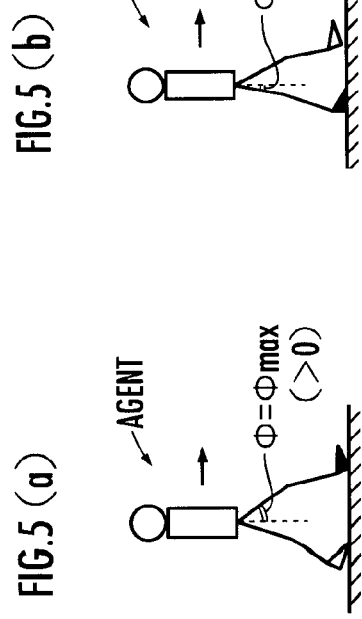
Figure 8:
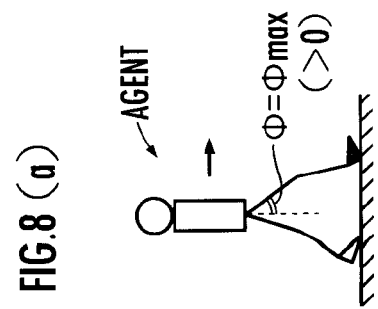
FIG. 8($a$)-FIG. 8($d$) are illustrative diagrams related to variation behaviors of a walking motion of the agent.
Figure 8:
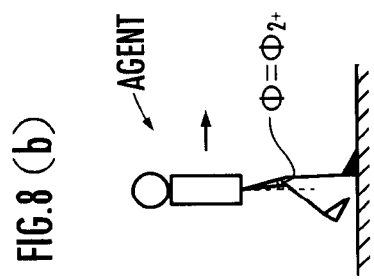
Figure 8:
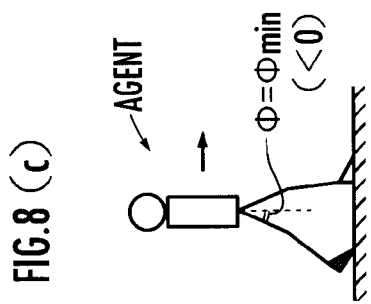
Figure 8:
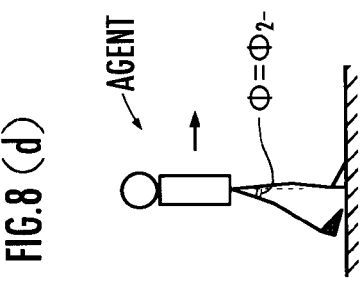

The leg angle $\phi$ denotes an inclination angle of the thigh with respect to a reference frontal plane (refer to FIG. 5 and FIG. 8). The leg angle $\phi$ is defined as being "positive" when the thigh is positioned in the front side of the reference frontal plane and being "negative" when the thigh is positioned in the back side of the reference frontal plane. The reference frontal plane is defined according to the inclination posture of the upper body including the waist of the agent in the anteroposterior direction.

The leg angular velocity $\phi'$ is defined as being "positive" when the thigh is approaching to the reference frontal plane from the back side or leaving away from the reference frontal plane to the front side and being "negative" when the thigh is approaching to the reference frontal plane from the front side or leaving away from the reference frontal plane to the back side.

On the basis of the calculation, the controller 20 controls the operations of the actuator 22 according to a mode specified by the agent through the interface 204 to adjust a force applied to the agent. The magnitude of the applied force may be adjusted by controlling either one side or both sides of the output from the motor 221 and the reduction ratio (gear ratio) of the reduction mechanism 222.

The force is considered as a torque F for swinging the thigh of the agent around the hip joint in the anteroposterior direction with respect to the upper body as reference. The torque F is defined as being "positive" when the torque F is applied to the agent to increase the leg angle $\phi$ and being "negative" when the torque F is applied to the agent to decrease the leg angle $\phi$.

(Assist Mode)

When an assist mode is selected by the agent, the torque F applied to the agent is adjusted according to an assist function $F_1(\phi, \phi')$, the determined values of the leg angle $\phi$ and the leg angular velocity $\phi'$.

Figure 3:
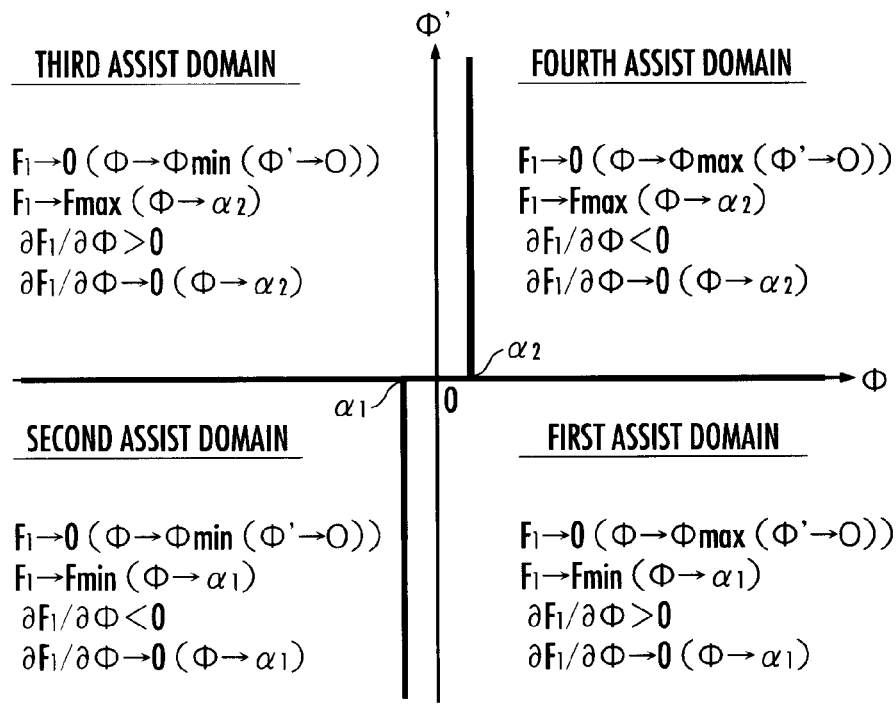
FIG. 3($a$) and FIG. 3($b$) are illustrative diagrams related to a determination method of a torque in an assist mode.
Figure 3:
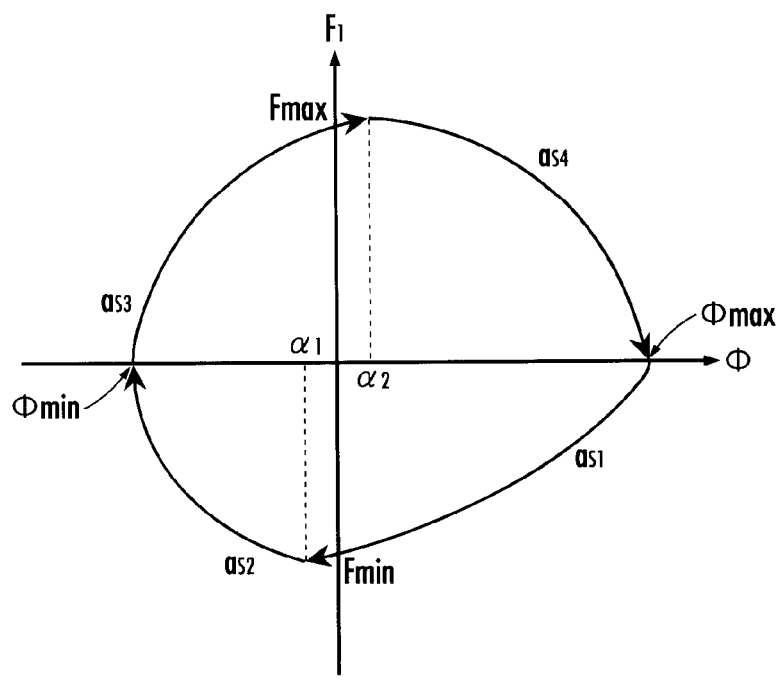

As to be described hereinafter, the assist function $F_1$ is defined to exhibit different properties in a first assist domain $[\alpha_1 < \phi] \times [\phi' < 0]$, a second assist domain $[\phi < \alpha_1] \times [\phi' < 0]$, a third assist domain $[\phi < \alpha_2] \times [0 < \phi']$ and a fourth assist domain $[\alpha_2 < \phi] \times [0 < \phi']$ as illustrated in FIG. 3(a).

The first assist reference angle $\alpha_1$ for specifying the boundary between the first assist domain and the second assist domain, and the second assist reference angle $\alpha_2$ for specifying the boundary between the third assist domain and the fourth assist domain may be set at an arbitrary value, respectively (for example zero).

In the first assist domain, the assist function $F_1$ has a variation property of approaching to zero as the leg angular velocity $\phi'$ approaches to zero (the leg angle $\phi$ approaches to the maximum value $\phi_{max}$ and approaching to the function minimum value $F_{min}$ as the leg angle $\phi$ approaches to the first assist reference angle $\alpha_1$. In the first assist domain, the partial differential function $\partial F_1/\partial \phi$ of the assist function $F_1$ by the leg angle $\phi$ is "positive" and has a variation property of approaching to zero as the leg angle $\phi$ approaches to the first assist reference angle $\alpha_1$.

In the second assist domain, the assist function $F_1$ has a variation property of approaching to zero as the leg angular velocity $\phi'$ approaches to zero (the leg angle $\phi$ approaches to the minimum value $\phi_{min}$ and approaching to the function minimum value $F_{min}$ as the leg angle $\phi$ approaches to the first assist reference angle $\alpha_1$. In the second assist domain, the partial differential function $\partial F_1/\partial \phi$ of the assist function $F_1$ by the leg angle $\phi$ is "negative" and has a variation property of approaching to zero as the leg angle $\phi$ approaches to the first assist reference angle $\alpha_1$.

In the third assist domain, the assist function $F_1$ has a variation property of approaching to zero as the leg angular velocity $\phi'$ approaches to zero (the leg angle $\phi$ approaches to the minimum value $\phi_{min}$) and approaching to the function maximum value $F_{max}$ as the leg angle $\phi$ approaches to the second assist reference angle $\alpha_2$. In the third assist domain, the partial differential function $\partial F_1/\partial \phi$ of the assist function $F_1$ by the leg angle $\phi$ is "positive" and has a variation property of approaching to zero as the leg angle $\phi$ approaches to the second assist reference angle $\alpha_2$.

In the fourth assist domain, the assist function $F_1$ has a variation property of approaching to zero as the leg angular velocity $\phi'$ approaches to zero (the leg angle $\phi$ approaches to the maximum value $\phi_{max}$) and approaching to the function maximum value $F_{max}$ as the leg angle $\phi$ approaches to the second assist reference angle $\alpha_2$. In the fourth assist domain, the partial differential function $\partial F_1/\partial \phi$ of the assist function $F_1$ by the leg angle $\phi$ is "negative" and has a variation property of approaching to zero as the leg angle $\phi$ approaches to the second assist reference angle $\alpha_2$.

FIG. 3(b) illustrates a trajectory of a variation behavior of an assist torque in a $F_1$-$\phi$ plane defined by the assist function $F_1$ and the leg angle $\phi$. The trajectory has arrowed lines of as1 to as4 connected circularly. The arrowed lines of as1 to as4 correspond to the first to the fourth assist domains, respectively. The shape of each arrowed line of as1 to as4 in the $F_1$–$\phi$ plane may be represented by an approximated curve expression such as $F_{1i}=A_{1i}\phi^2+B_{1i}\phi+C_{1i}$ (i=1, 2, 3, 4).

Figure 4:
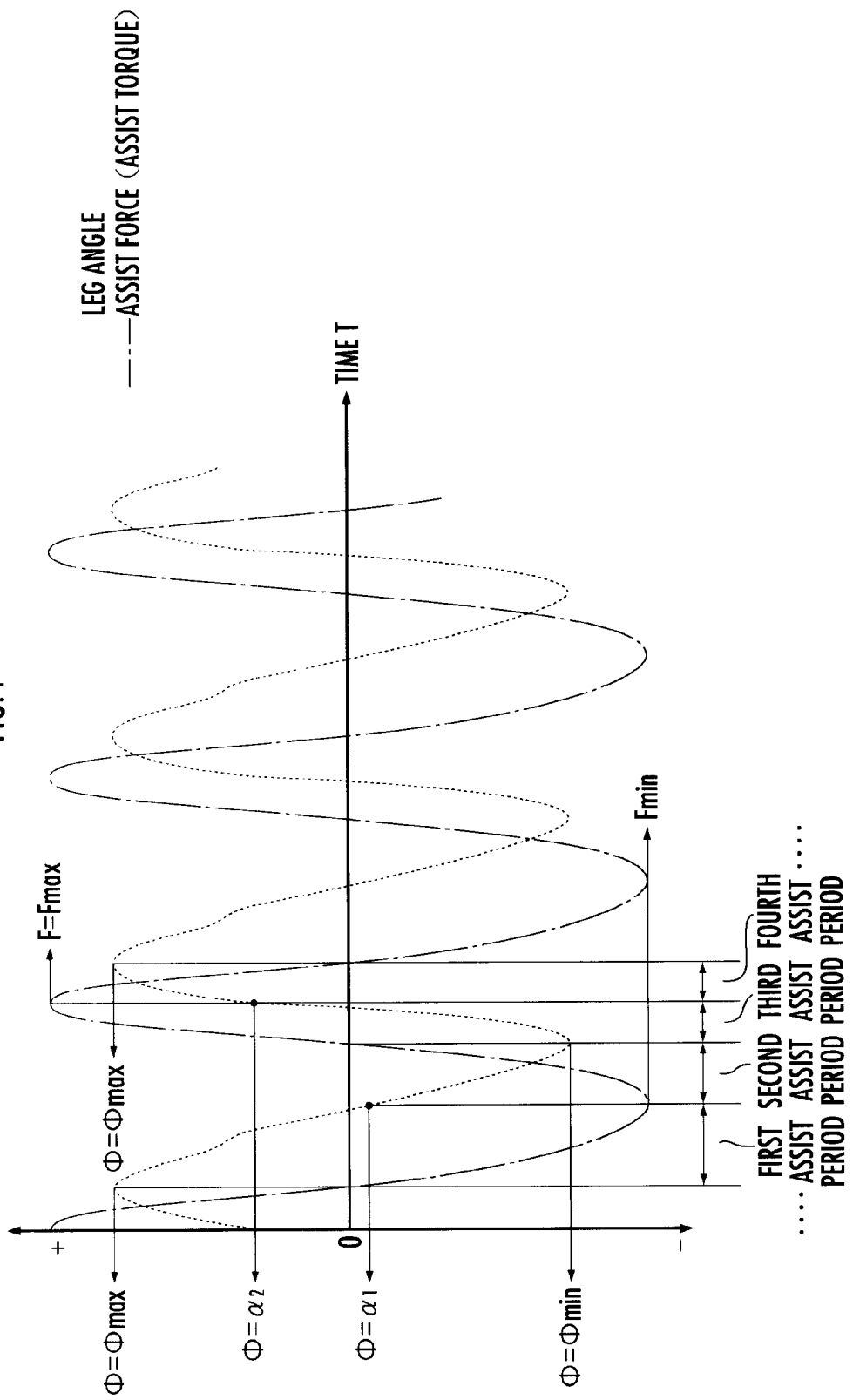
FIG. 4 is an illustrative diagram related to a variation behavior of the torque in the assist mode.

Suppose that the agent is walking with the leg angle $\phi$ of each of the left and right legs varied periodically as illustrated in FIG. 4 by a dashed line. In this case, as illustrated in FIG. 4 by a chain line, the operation of the actuator 22 is controlled according to the assist function $F_1$ having the aforementioned properties so as to apply the assist torque (assist force) to the agent.

Specifically, in this case, the four periods vary periodically from the first assist period, the second assist period, the third assist period to the fourth assist period. The ith assist period (i=1-4) refers to a duration where the determined values ($\phi$, $\phi'$) are contained in the ith assist domain.

In the first assist period, the assist torque is controlled to decrease successively from zero to the minimum value $F_{min}$ (refer to FIG. 4). In other words, the assist force applied to the relative motion between the upper body and a standing leg supporting the agent which makes the upper body translate forward is applied to the agent in a variation behavior of starting from zero and becoming stronger gradually thereafter (refer to the drawings from FIG. 5(a) to FIG. 5(b)).

In the second assist period, the assist torque is controlled to increase successively from the minimum value $F_{min}$ to zero (refer to FIG. 4). In other words, the assist force applied to the relative motion between the upper body and a standing leg supporting the agent which makes the upper body translate forward is applied to the agent in a variation behavior of starting from a stronger one and decreasing gradually to zero finally (refer to the drawings from FIG. 5(b) to FIG. 5(c)).

In the third assist period, the assist torque is controlled to increase successively from zero to the maximum value $F_{max}$ (refer to FIG. 4). In other words, the assist force applied to the relative motion between the upper body and a free leg of the agent which makes mainly the free leg translate forward is applied to the agent in a variation behavior of starting from zero and becoming stronger gradually thereafter (refer to the drawings from FIG. 5(c) to FIG. 5(d)).

In the fourth assist period, the assist torque is controlled to decrease successively from the maximum value $F_{max}$ to zero (refer to FIG. 4). In other words, the assist force applied to the relative motion between the upper body and a free leg of the agent which makes mainly the free leg translate forward is applied to the agent in a variation behavior of starting from a stronger one and decreasing gradually to zero finally (refer to the drawings from FIG. 5(d) to FIG. 5(a)).

(Training Mode)

When a training mode is selected by the agent, the torque F applied to the agent is adjusted according to a training function $F_2$ ($\phi$, $\phi'$), the determined values of the leg angle $\phi$ and the leg angular velocity $\phi'$.

Figure 6:
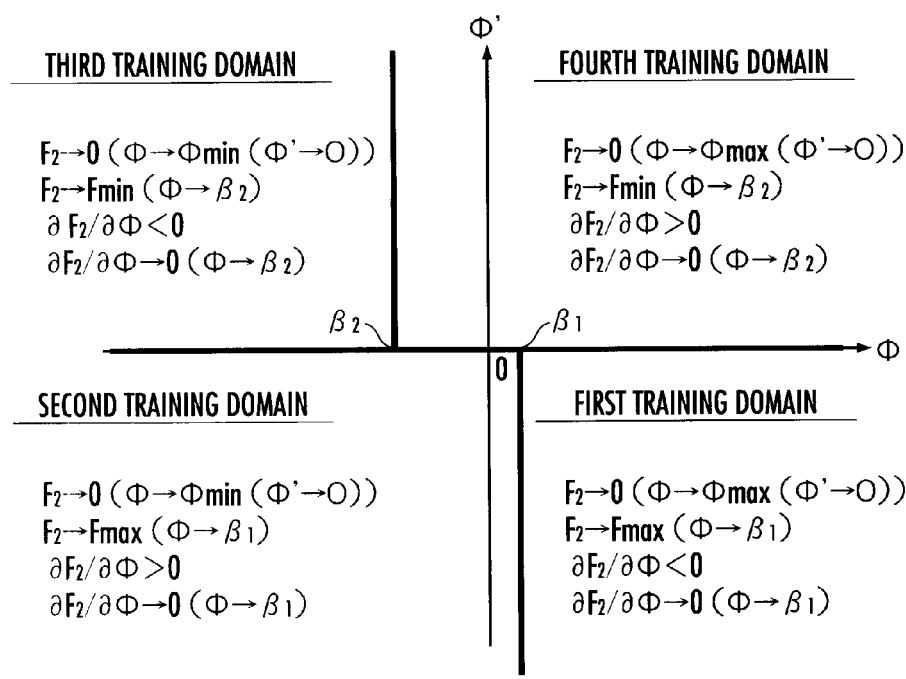
FIG. 6($a$) and FIG. 6($b$) are illustrative diagrams related to a determination method of a torque in a training mode.
Figure 6:
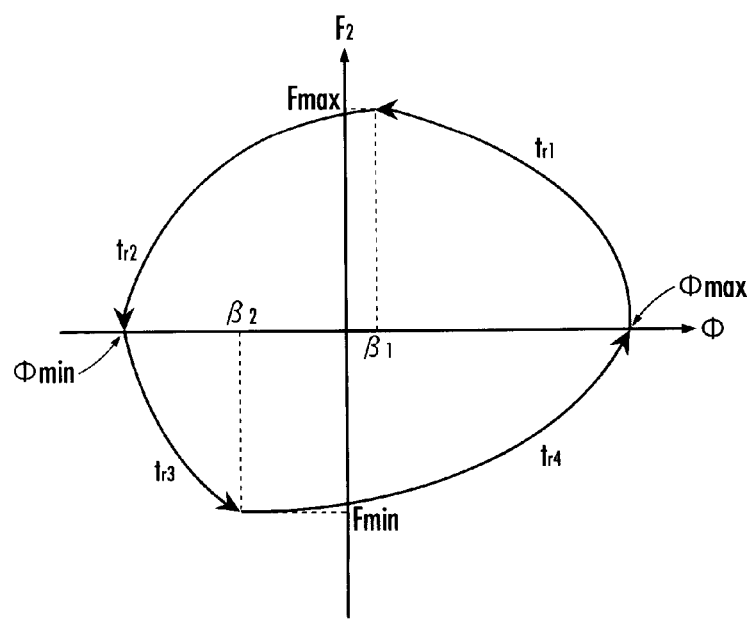

As to be described hereinafter, the training function $F_2$ is defined to exhibit different properties in a first training domain [$\beta_1<\phi$]×[$\phi'<0$], a second training domain [$\phi<\beta_1$]×[$\phi'<0$], a third training domain [$\phi<\beta_2$]×[$0<\phi'$] and a fourth training domain [$\beta_2<\phi$]×[$0<\phi'$] as illustrated in FIG. 6(a).

The first training reference angle $\beta_1$ for specifying the boundary between the first training domain and the second training domain, and the second training reference angle $\beta_2$ for specifying the boundary between the third training domain and the fourth training domain may be set at an arbitrary value, respectively (for example zero).

In the first training domain, the training function $F_2$ has a variation property of approaching to zero as the leg angular velocity $\phi'$ approaches to zero (the leg angle $\phi$ approaches to the maximum value $\phi_{max}$) and approaching to the function maximum value $F_{max}$ as the leg angle $\phi$ approaches to the first training reference angle $\beta_1$. In the first training domain, the partial differential function $\partial F_2/\partial\phi$ of the training function $F_2$ by the leg angle $\phi$ is "negative" and has a variation property of approaching to zero as the leg angle $\phi$ approaches to the first training reference angle $\beta_1$.

In the second training domain, the training function $F_2$ has a variation property of approaching to zero as the leg angular velocity $\phi'$ approaches to zero (the leg angle $\phi$ approaches to the minimum value $\phi_{min}$) and approaching to the function maximum value $F_{max}$ as the leg angle $\phi$ approaches to the first training reference angle $\beta_1$. In the second training domain, the partial differential function $\partial F_2/\partial\phi$ of the training function $F_2$ by the leg angle $\phi$ is "positive" and has a variation property of approaching to zero as the leg angle $\phi$ approaches to the first training reference angle $\beta_1$.

In the third training domain, the training function $F_2$ has a variation property of approaching to zero as the leg angular velocity $\phi'$ approaches to zero (the leg angle $\phi$ approaches to the minimum value $\phi_{min}$) and approaching to the function minimum value $F_{min}$ as the leg angle $\phi$ approaches to the second training reference angle $\beta_2$. In the third training domain, the partial differential function $\partial F_2/\partial\phi$ of the training function $F_2$ by the leg angle $\phi$ is "negative" and has a variation property of approaching to zero as the leg angle $\phi$ approaches to the second training reference angle $\beta_2$.

In the fourth training domain, the training function $F_2$ has a variation property of approaching to zero as the leg angular velocity $\phi'$ approaches to zero (the leg angle $\phi$ approaches to the maximum value $\phi_{max}$) and approaching to the function minimum value $F_{min}$ as the leg angle $\phi$ approaches to the second training reference angle $\beta_2$. In the fourth training domain, the partial differential function $\partial F_2/\partial\phi$ of the training function $F_2$ by the leg angle $\phi$ is "positive" and has a variation property of approaching to zero as the leg angle $\phi$ approaches to the second training reference angle $\beta_2$.

FIG. 6(b) illustrates a trajectory of a variation behavior of a training torque in a $F_2$–$\phi$ plane defined by the training function $F_2$ and the leg angle $\phi$. The trajectory has arrowed lines of tr1 to tr4 connected circularly. The arrowed lines of tr1 to tr4 correspond to the first to the fourth training domains, respectively. The shape of each arrowed line of tr1 to tr4 in the $F_2$–$\phi$ plane may be represented by an approximated curve expression such as $F_{2i}=A_{2i}\phi^2+B_{2i}\phi+C_{2i}$ (i=1, 2, 3, 4).

Figure 7:
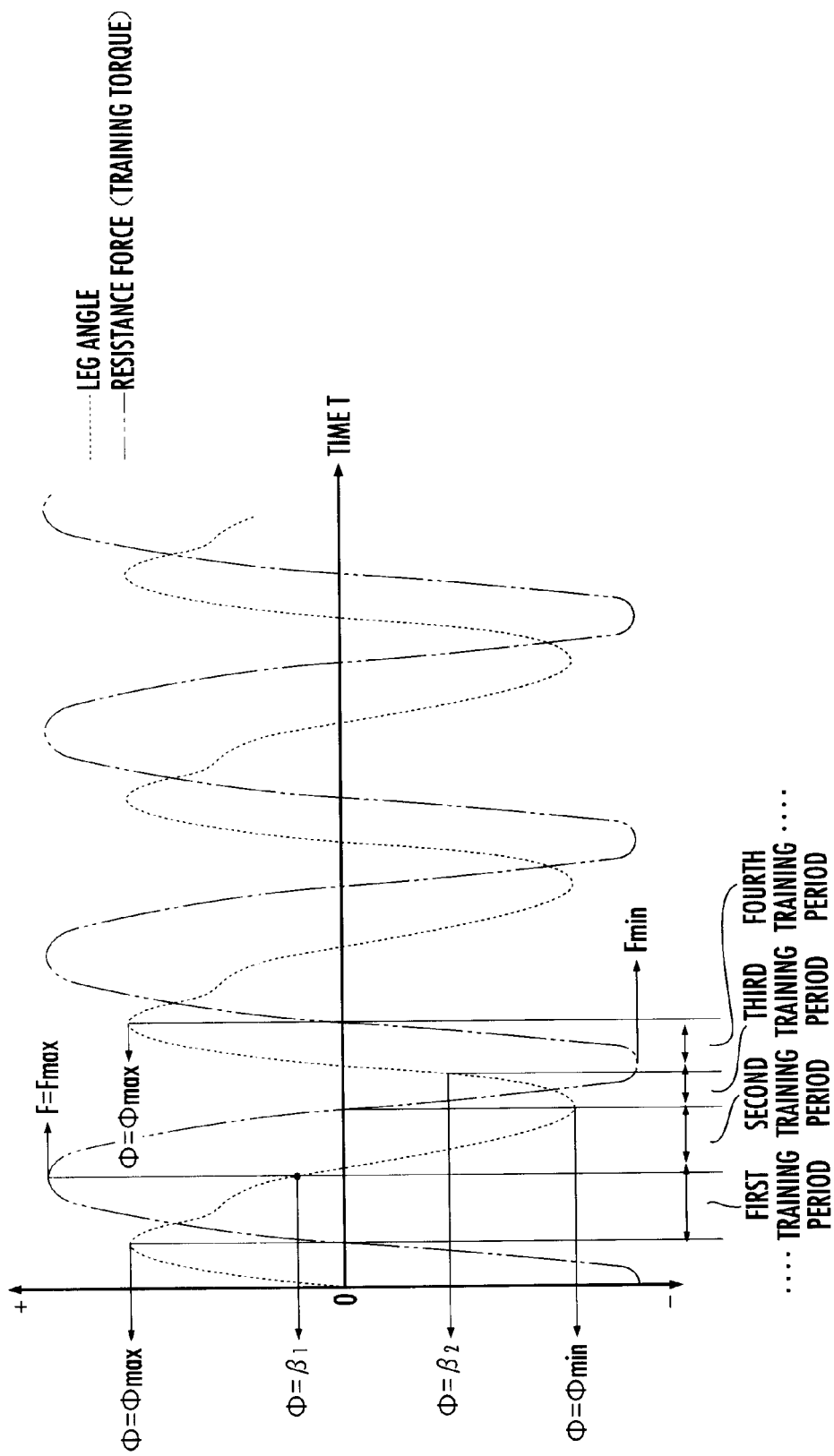
FIG. 7 is an illustrative diagram related to a variation behavior of the torque in the training, mode.

Suppose that the agent is walking with the leg angle $\phi$ of each of the left and right legs varied periodically as illustrated in FIG. 7 by a dashed line. In this case, as illustrated in FIG. 7 by a two-dot chain line, the operation of the actuator 22 is controlled according to the training function $F_2$ having the aforementioned properties so as to apply the training torque (resistance force) to the agent.

Specifically, in this case, the four periods vary periodically from the first training period, the second training period, the third training period to the fourth training period. The ith training period (i=1-4) refers to a duration where the determined values ($\phi$, $\phi'$) are contained in the ith training domain.

In the first training period, the training torque is controlled to increase successively from zero to the maximum value $F_{max}$ (refer to FIG. 7). In other words, the resistance force applied to the relative motion between the upper body and a standing leg supporting the agent which makes the upper body translate forward is applied to the agent in a variation behavior of starting from zero and becoming stronger gradually thereafter (refer to the drawings from FIG. 8(a) to FIG. 8(b)).

In the second training period, the training torque is controlled to decrease successively from the maximum value $F_{max}$ to zero (refer to FIG. 7). In other words, the resistance force applied to the relative motion between the upper body and a standing leg supporting the agent which makes the upper body translate forward is applied to the agent in a variation behavior of starting from a stronger one and decreasing gradually to zero finally (refer to the drawings from FIG. 8(b) to FIG. 8(c)).

In the duration when a leg of the walking agent is standing, the resistance force varies from zero at the beginning and then becoming stronger gradually, thereafter decreasing gradually to zero at the end (refer to the drawings from FIG. 8(a) to FIG. 8(b) to FIG. 8(c)).

In the third training period, the training torque is controlled to decrease successively from zero to the minimum value $F_{min}$ (refer to FIG. 7). In other words, the resistance force applied to the relative motion between the upper body and a free leg of the agent which makes mainly the free leg translate forward is applied to the agent in a variation behavior of starting from zero and becoming stronger gradually thereafter (refer to the drawings from FIG. 8(c) to FIG. 8(d)).

In the fourth training period, the training torque is controlled to increase successively from the minimum value $F_{min}$ to zero (refer to FIG. 7). In other words, the resistance force applied to the relative motion between the upper body and a free leg of the agent which makes mainly the free leg translate forward is applied to the agent in a variation behavior of starting from a stronger one and decreasing gradually to zero finally (refer to the drawings from FIG. 8(d) to FIG. 8(a)).

In the duration when a leg of the walking agent is free, the resistance force varies from zero at the beginning and then becoming stronger gradually, thereafter decreasing gradually to zero at the end (refer to the drawings from FIG. 8(c) to FIG. 8(d) to FIG. 8(a)).

Figure 12:
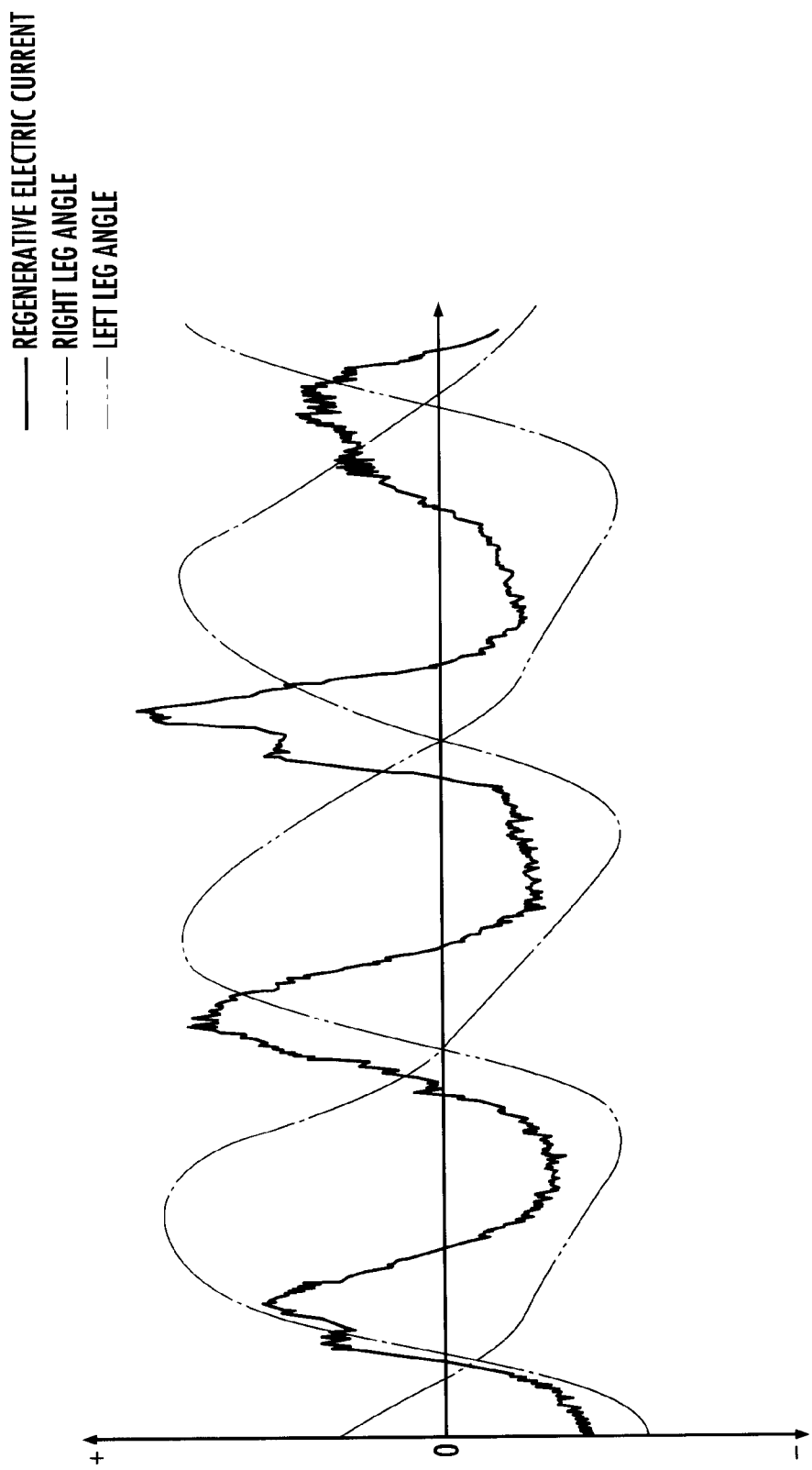
FIG. 12 is an illustrative diagram related to regenerative electrical current.

When the resistance force is being applied to the agent via the regenerative braking of the motor 221 in the training mode, the motor 221 functions as a generator to generate electric energy and the generated electric energy is stored in the battery 21. In a process when the agent is walking with the right leg angle (denoted by the chain line) and the left leg angle (denoted by the two-dot chain line) varied as illustrated in FIG. 12, the regenerative electric current (a solid line) generated from the regenerative braking of the left and right motors 221 is supplied to the inverter and stored in the battery 21 as the electric energy.

A connection terminal is provided in the training device 1 for external electronic equipment such as a cell phone. Thereby, the electric energy can be supplied to the external electronic equipment through the connection terminal from the battery 21 and used by the external electronic equipment.

(Hybrid Mode)

When a hybrid mode is selected by the agent, the torque F applied to the agent is adjusted according to a hybrid function $F_3$ ($\phi$, $\phi'$), the determined values of the leg angle $\phi$ and the leg angular velocity $\phi'$. In each walking cycle of the agent, the hybrid mode is referred to as a mode where the assist mode and the training mode work separately.

Figure 9:
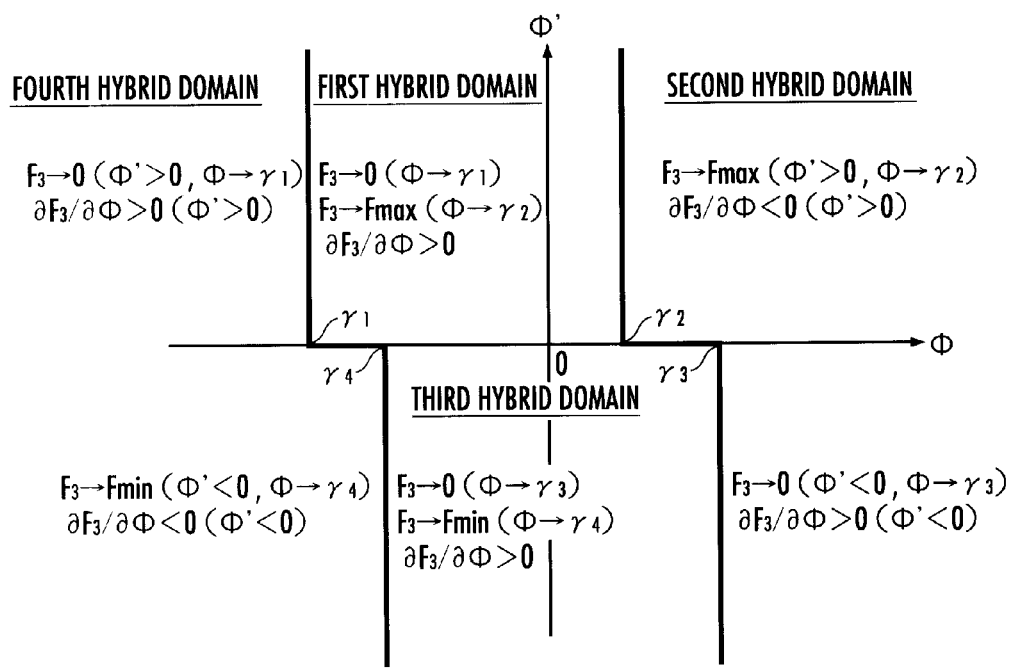
FIG. 9($a$) and FIG. 9($b$) are illustrative diagrams related to a determination method of a torque in a hybrid mode.
Figure 9:
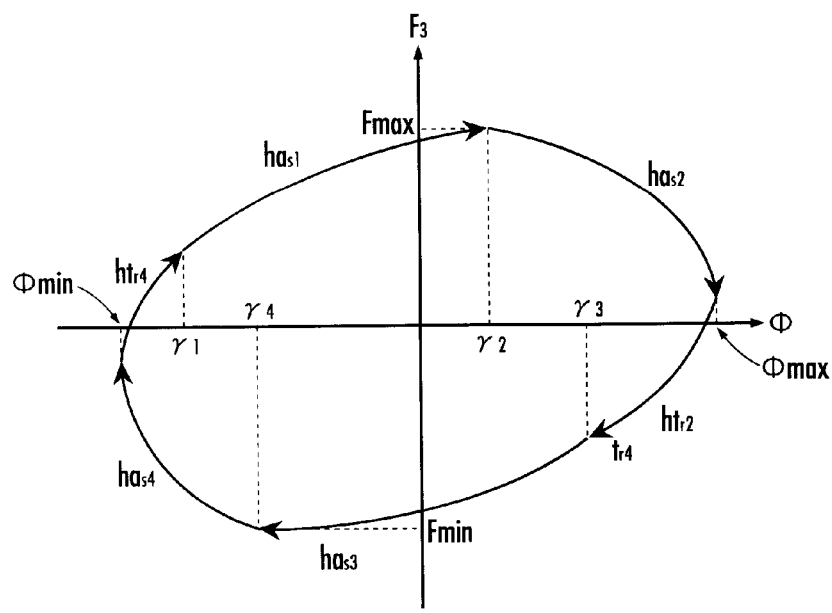

As to be described hereinafter, the hybrid function $F_3$ is defined to exhibit different properties in a first hybrid domain $[\gamma_1 < \phi < \gamma_2] \times [0 < \phi']$, a second hybrid domain $[\gamma_2 < \phi] \times [0 < \phi'] + [\gamma_3 < \phi] \times [\phi' < 0]$, a third hybrid domain $[\gamma_4 < \phi < \gamma_3] \times [\phi' < 0]$ and a fourth hybrid domain $[\phi < \gamma_4] \times [\phi' < 0] + [\phi < \gamma_1] \times [0 < \phi']$ as illustrated in FIG. 9(a).

The first hybrid reference angle $\gamma_1$, the second hybrid reference angle $\gamma_2$, the third hybrid reference angle $\gamma_3$, and the fourth hybrid reference angle $\gamma_4$ for specifying the boundary of each hybrid domain may be set at an arbitrary value, respectively.

In the first hybrid domain, the hybrid function $F_3$ has a variation property of approaching to zero as the leg angle $\phi$ approaches to the first hybrid reference angle $\gamma_1$ and approaching to the function maximum value $F_{max}$ as the leg angle $\phi$ approaches to the second hybrid reference angle $\gamma_2$. In the first hybrid domain, the partial differential function $\partial F_3/\partial \phi$ of the hybrid function $F_3$ by the leg angle $\phi$ is "positive".

In the second hybrid domain, the hybrid function $F_3$ has a variation property of approaching to zero as the leg angle $\phi$ approaches to the third hybrid reference angle $\gamma_3$ when the leg angular velocity $\phi'$ is negative and approaching to the function maximum value $F_{max}$ as the leg angle $\phi$ approaches to the second hybrid reference angle $\gamma_2$ when the leg angular velocity $\phi'$ is positive. In the second hybrid domain, the partial differential function $\partial F_3/\partial \phi$ of the hybrid function $F_3$ by the leg angle $\phi$ is "negative" when the leg angular velocity $\phi'$ is positive and is "positive" when the leg angular velocity $\phi'$ is negative.

In the third hybrid domain, the hybrid function $F_3$ has a variation property of approaching to zero as the leg angle $\phi$ approaches to the third hybrid reference angle $\gamma_3$ and approaching to the function minimum value $F_{min}$ as the leg angle $\phi$ approaches to the fourth hybrid reference angle $\gamma_4$. In the third hybrid domain, the partial differential function $\partial F_3/\partial \phi$ of the hybrid function $F_3$ by the leg angle $\phi$ is "positive".

In the fourth hybrid domain, the hybrid function $F_3$ has a variation property of approaching to zero as the leg angle $\phi$ approaches to the first hybrid reference angle $\gamma_1$ when the leg angular velocity $\phi'$ is positive and approaching to the function minimum value $F_{min}$ as the leg angle $\phi$ approaches to the fourth hybrid reference angle $\gamma_4$ when the leg angular velocity $\phi'$ is negative. In the fourth hybrid domain, the partial differential function $\partial F_3/\partial \phi$ of the hybrid function $F_3$ by the leg angle $\phi$ is "negative" when the leg angular velocity $\phi'$ is negative and is "positive" when the leg angular velocity $\phi'$ is positive.

FIG. 9(b) illustrates a trajectory of a variation behavior of a hybrid torque in a $F_3$–$\phi$ plane defined by the hybrid function $F_3$ and the leg angle $\phi$. The trajectory has arrowed lines of has1, has2, htr2, has3, has4 and htr4 connected circularly. The arrowed line has1 corresponds to the first hybrid domain. The arrowed line has2 corresponds to the assist mode in the second hybrid domain and the arrowed line htr2 corresponds to the training mode in the second hybrid domain. The arrowed line has3 corresponds to the third hybrid domain. The arrowed line has4 corresponds to the assist mode in the fourth hybrid domain and the arrowed line htr4 corresponds to the training mode in the fourth hybrid domain. The shape of each arrowed line of has1, has2, htr2, has3, has4 and htr4 in the $F_3$–$\phi$ plane may be represented by an approximated curve expression such as $F_{3k}=A_{3k}\phi^2+B_{3k}+C_{3k}$ (k=has1, has2, htr2, has3, has4 and htr4).

Figure 10:
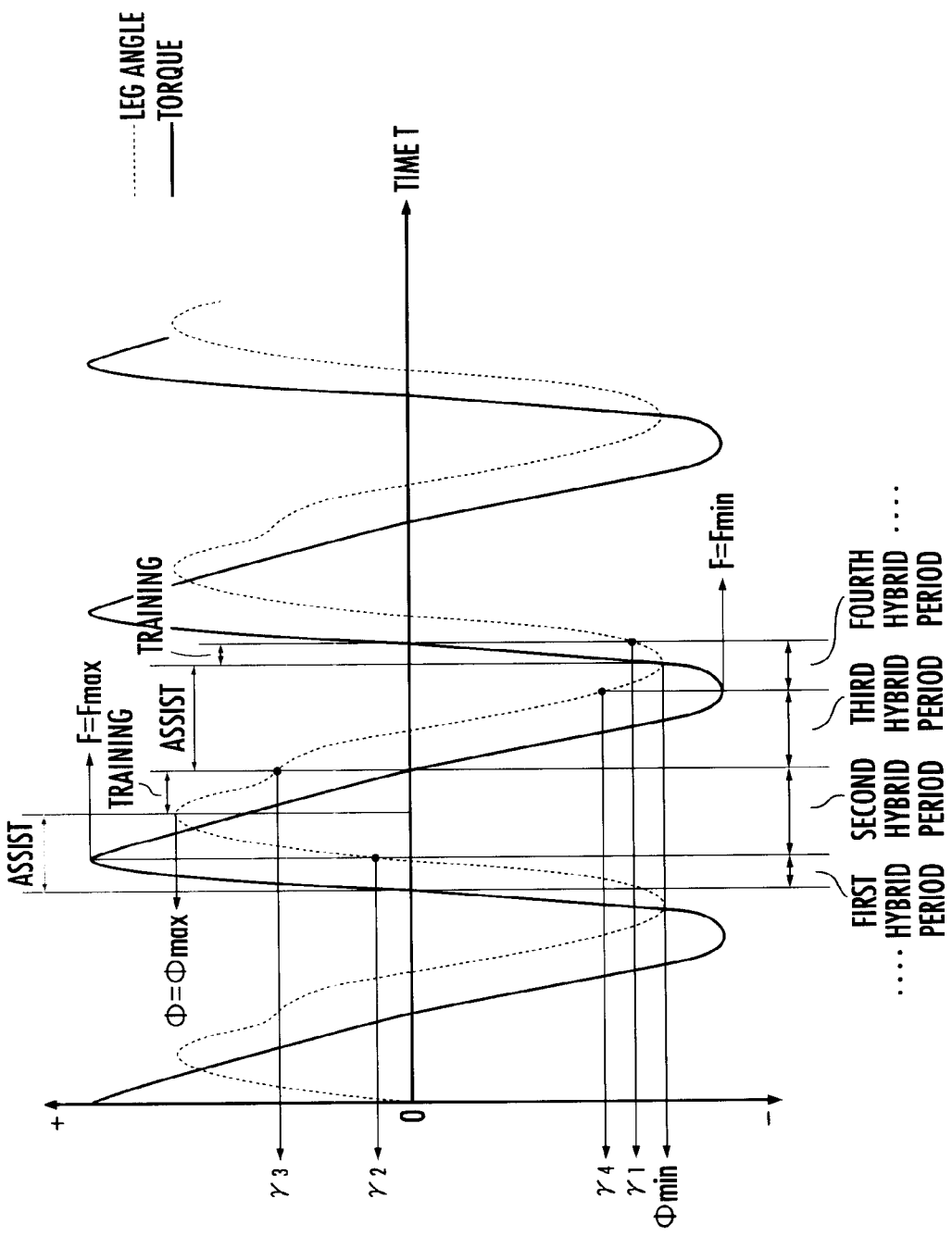
FIG. 10 is an illustrative diagram related to a variation behavior of the torque in the hybrid mode.

Suppose that the agent is walking with the leg angle $\phi$ of each of the left and right legs varied periodically as illustrated in FIG. 10 by a dashed line. In this case, as illustrated in FIG. 10 by a solid line, the operation of the actuator 22 is controlled according to the hybrid function $F_3$ having the aforementioned properties so as to apply a torque to the agent.

Specifically, in this case, the four periods vary periodically from the first hybrid period, the second hybrid period, the third hybrid period to the fourth hybrid period. The ith hybrid period (i=1-4) refers to a duration where the determined values ($\phi$, $\phi'$) are contained in the ith hybrid domain.

Figure 11:
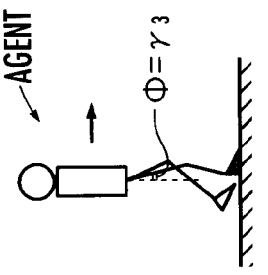
FIG. 11($a$)-FIG. 11($f$) are illustrative diagrams related to variation behaviors of a walking motion of the agent.
Figure 11:
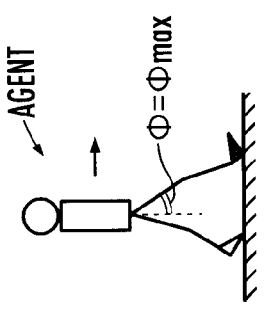
Figure 11:
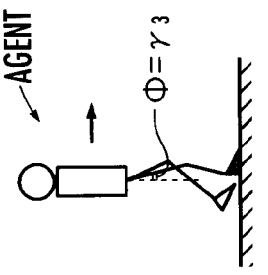
Figure 11:
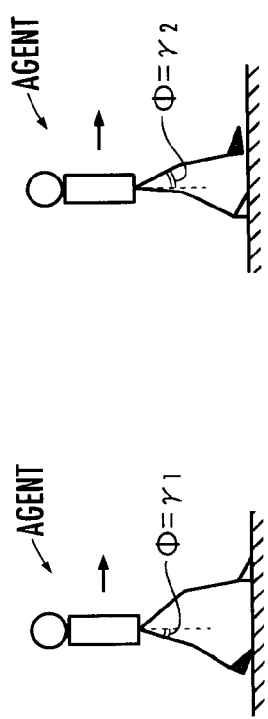
Figure 11:
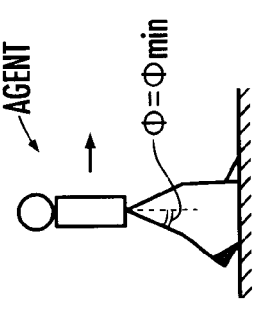
Figure 11:
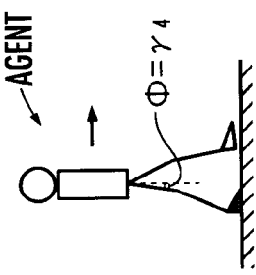

In the first hybrid period, the torque is controlled to increase successively from zero to the maximum value $F_{max}$ (refer to FIG. 10). In other words, the assist force applied to the relative motion between the upper body and a free leg of the agent which makes mainly the free leg translate forward is applied to the agent in a variation behavior of starting from zero and becoming stronger gradually thereafter (refer to the drawings from FIG. 11(a) to FIG. 11(b)).

In the second hybrid period, the torque is controlled to decrease successively from the maximum value $F_{max}$ to zero (refer to FIG. 10). In other words, firstly, the assist force applied to the relative motion between the upper body and a free leg of the agent which makes mainly the free leg translate forward is applied to the agent in a variation behavior of starting from a stronger one and decreasing gradually (refer to the drawings from FIG. 11(b) to FIG. 11(c)). Then, the resistance force applied to the relative motion between the upper body and a standing leg supporting the agent which makes the upper body translate forward is applied to the agent in a variation behavior (initial motion load behavior) of starting from a stronger one and decreasing gradually to zero finally (refer to the drawings from FIG. 11(c) to FIG. 11(d)).

In the third hybrid period, the torque is controlled to decrease successively from zero to the minimum value $F_{min}$ (refer to FIG. 10). In other words, the assist force applied to the relative motion between the upper body and a standing leg supporting the agent which makes the upper body translate forward is applied to the agent in a variation behavior of starting from zero and becoming stronger gradually thereafter (refer to the drawings from FIG. 11(d) to FIG. 11(e)).

In the fourth hybrid period, the torque is controlled to increase successively from the minimum value $F_{min}$ to zero (refer to FIG. 10). In other words, firstly, the assist force applied to the relative motion between the upper body and a standing leg supporting the agent which makes the upper body translate further forward is applied to the agent in a variation behavior of starting from a stronger one and decreasing gradually (refer to the drawings from FIG. 11(e) to FIG. 11(f)). Then, the resistance force applied to the relative motion between the upper body and a free leg of the agent which makes mainly the free leg translate forward is applied to the agent in a variation behavior (initial motion load behavior) of starting from a stronger one and decreasing gradually to zero finally (refer to the drawings from FIG. 11(f) to FIG. 11(a)).

In the hybrid mode mentioned above, the assist period and the training period are mixed in each walking cycle of the agent (refer to FIG. 10).

It is possible to alter the timing for switching from the assist period to the training period by altering the hybrid reference angle $\gamma_i$ (i=1-4). Moreover, by altering the hybrid reference angle $\gamma_i$, it is possible to alter the variation behavior of the resistance force applied to the agent in the training period into various forms, such as the initial motion load behavior, the final motion load behavior and the like.

Also in the hybrid mode, when the resistance force is being applied to the agent via the regenerative braking of the motor 221, the motor 221 functions as a generator to generate electric energy and the generated electric energy is stored in the battery 21 (refer to FIG. 12).

(Effect of the Training Device)

According to the training device 1 with the aforementioned functions, it is possible to apply a force to the agent along the direction of the relative motion between the upper body and the leg (assist force) and a force to the agent reverse to the direction of the relative motion between the upper body and the leg (resistance force). Thereby, when the agent is performing a walking motion or the like involving the relative motion between the upper body and the leg thereof, the forces can be applied to the agent in various behaviors.

According to the training device 1 with the aforementioned configuration, operation mode can be switched through the mode selection via the interface 204 between the assist mode and the training mode according to the wishes of the agent. Thereby, when the agent is performing a walking motion or the like involving the relative motion between the upper body and the leg thereof, the forces can be applied to the agent in various behaviors reflecting the wishes of the agent.

For example, when the agent is using the training device 1 in the training mode, by selecting the assist mode or the hybrid mode through the interface 204, the agent can use the training device 1 in the selected mode in place of the training mode.

In the assist mode, the operation of the actuator 22 is controlled in such a way that the assist force varies from zero successively and returns back to zero from the starting time to the ending time. In the training mode, the operation of the actuator 22 is controlled in such a way that the resistance force varies from zero successively and returns back to zero from the starting time to the ending time.

For example, if the assist mode is selected by the agent when the training device 1 is operating in the training mode, the training torque becomes equal to zero and is maintained at zero and the training device 1 starts to work in the assist mode at a timing where the initial value of the assist torque becomes equal to zero. The situation is similar to the above if the training mode is selected by the agent when the training device 1 is operating in the assist mode.

Accordingly, the assist force and the resistance force applied to the agent can be adjusted smoothly. Moreover, the polarity or direction of a force applied to the agent can be reversed smoothly at the timing where the assist mode and the training mode are switched.

According to the training device 1, the magnitude and the direction of the resistance force applied to the agent can be varied via the regenerative braking of the motor 221 according to at least one of the variation behavior of the relative posture (leg angle $\phi$) between the upper body and the leg of the agent and the temporal variation behavior (leg angular velocity $\phi'$) of the relative posture therebetween (refer to FIG. 7 and FIG. 10). Thereby, the kinetic energy of the agent can be converted into the electric energy by the regenerative braking of the motor 221 while the resistance force is being applied to the agent appropriate to the walking motion behavior denoted by the relative posture and the like of the upper body and the leg of the agent (refer to FIG. 12).

Another Embodiment of the Present Invention

It is acceptable that the controller 20 is configured to determine whether the leg of the agent is a standing leg or a free leg, and to control the actuator 22 to differentiate respectively the variation behaviors of the assist force and the resistance force according to the determination result. Specifically, it is acceptable that the assist force and the resistance force are adjusted respectively when it is determined that the leg of the agent is a standing leg stronger than those when it is determined that the leg of the agent is a free leg. Herein, the magnitude of a force means that the magnitude of a force or the amplitude of a torque in a situation where the other factors are identical except that the standing leg and the free leg are different (refer to FIG. 4, FIG. 7 and FIG. 10).

According to the training device with the aforementioned configuration, the magnitude of the assist force and the resistance force applied to the relative motion between the upper body and the leg thereof can be differentiated respectively whether the leg of the agent is a standing leg (a leg standing on the floor) or a free leg (a leg elevated from the floor).

The magnitude of the resistance force, namely the amount of electric energy generated by the regenerative braking can be adjusted in consideration of the difference between the magnitude of the kinetic energy used to vary the relative posture between the upper body and the leg of the agent when the leg is a standing leg and the magnitude of the kinetic energy used to vary the relative posture between the upper body and the leg of the agent when the leg is a free leg. Specifically, the kinetic energy needed to vary the relative posture between the upper body and the leg becomes greater due to the translation force or the inertial force of the upper body when the leg is a standing leg than that when the leg is a free leg. Thereby, when the leg is a standing leg, the resistance force applied to the agent is increased to generate more electric energy. On the contrary, when the leg is a free leg, the force applied to the agent is decreased so that the generated electric energy becomes less. Accordingly, the kinetic energy of the agent can be converted into the electric energy by the regenerative braking of the motor 221 while a resistance force is being applied to the agent appropriate to the walking motion behavior denoted by a free leg and a standing leg of the agent respectively.

In addition to the determined values of the leg angle $\phi$ and the leg angular velocity $\phi'$, whether a leg is a standing leg or a free leg can be determined according to an output signal from an acceleration sensor configured to determine an acceleration in the vertical direction of the upper body of the agent, an output signal from a pressure sensor disposed at the sole (preferably both the heel and the tip of a toe) of a foot of the agent, or the like.

It is acceptable that the controller 20 is configured to recognize a posture of a walking surface where the agent walks, and to control the actuator 22 to differentiate respectively the variation behaviors of the assist force and the resistance force according to different recognition results.

For example, the assist force may be adjusted stronger when it is recognized that the posture of the walking surface is an ascending inclination posture than that when it is recognized that the posture of the walking surface is a flat posture or a descending inclination posture. The assist force may be adjusted stronger when it is recognized that the posture of the walking surface is a flat posture than that when it is recognized that the posture of the walking surface is a descending inclination posture.

Moreover, the resistance force may be adjusted stronger when it is recognized that the posture of the walking surface is a descending inclination posture than that when it is recognized that the posture of the walking surface is a flat posture or an ascending inclination posture. The resistance force may be adjusted stronger when it is recognized that the posture of the walking surface is a flat posture than that when it is recognized that the posture of the walking surface is an ascending inclination posture.

According to the training device with the aforementioned configuration, the assist force and the resistance force applied to the agent can be adjusted appropriately in view of a difference of the magnitude of forces needed to be applied to the relative walking motion between the upper body and the leg according to the posture of the ground surface or floor surface (walking surface) where the agent is walking.

Moreover, the variation behaviors of the resistance force applied to the relative motion between the upper body and the leg of the agent, namely the variation behavior of the electric energy generated by the regenerative braking can be adjusted appropriately according to the posture of the ground surface or floor surface (walking surface) where the agent is walking.

Specifically, the resistance force applied to the agent can be adjusted appropriately in view of a difference of the magnitude of force needed to be applied to the relative walking motion between the upper body and the leg according to the posture of the ground surface or floor surface (walking surface) where the agent is walking. Accordingly, the kinetic energy of the agent can be converted into the electric energy via the regenerative braking of the motor 221 while a resistance force is being applied to the agent appropriately in view of the posture of the surface where the agent is walking.

The posture of a walking surface can be determined according to a motion pattern of a leg of the agent and an approach disclosed in, for example, Japan Patent Publication No. 3833921 and No. 3908735. When the agent is ascending a slope or steps, the walking surface has an ascending inclination posture. When the agent is walking on a flat ground the walking surface has a flat posture. When the agent is descending a slope or steps, the walking surface has a descending inclination posture. It is acceptable to recognize an actual inclination angle as a posture of a walking surface other than the types of the posture of the walking surface.

It is acceptable that the controller 20 is configured to determine the degree of fatigue of the agent and switch between the assist mode and the training mode according to the determination result.

According to the training device with the aforementioned configuration, the assist force applied to the agent with respect to the direction of the relative motion between the upper body and the leg thereof and the resistance force applied to the agent with respect to the direction of the relative motion between the upper body and the leg thereof can be realized according to the degree of fatigue.

The degree of fatigue of the agent may be evaluated higher, for example, as the continued using time of the training device 1 by the agent (the time for the ON/OFF switch being switched on) becomes longer. It is acceptable to evaluate the degree of fatigue higher as the walking velocity (obtained from the leg angular velocity) of the agent becomes slower. It is also acceptable to evaluate the degree of fatigue higher as the accumulated using time of the training device 1 in the training mode becomes longer. Further, the degree of fatigue may be evaluated higher as the accumulated working amount (=training torque×angular translation) by a training torque (resistance force) becomes greater. Furthermore, the degree of fatigue may be evaluated higher as the heart rate or blood pressure of the agent becomes higher.

It is acceptable that the training device 1 is provided with a second interface configured to enable the agent to select one mode from a plurality of assist modes with the assist force having different variation behaviors under identical conditions. It is acceptable that the controller 20 is configured to control the actuator 22 according to the one mode of the plurality of assist modes selected according to a signal output from the second interface corresponded to the selection by the agent.

According to the training device with the aforementioned configuration, one assist mode can be switched from a plurality of assist modes according to the wishes of the agent. Thereby, when the agent is performing a walking motion or the like involving the relative motion between the upper body and the leg thereof, the assist force can be applied to the agent in various behaviors reflecting the wishes of the agent.

It is acceptable that the training device 1 is further provided with a third interface configured to enable the agent to select one mode from a plurality of training modes with the resistance force having different variation behaviors under identical conditions. It is acceptable that the controller 20 is configured to control the actuator 22 according to the one mode of the plurality of training modes selected according to a signal output from the third interface corresponded to the selection by the agent.

According to the training device with the aforementioned configuration, one training mode can be switched from a plurality of training modes according to the wishes of the agent. Thereby, when the agent is performing a walking motion or the like involving the relative motion between the upper body and the leg thereof, the resistance force can be applied to the agent in various behaviors reflecting the wishes of the agent.

It is acceptable that the controller 20 is configured to determine at least one of a walking cycle, a footstep, a walking frequency and a walking ratio as a walking state variant and control the actuator 20 to match a determined value of the walking state variant with a desired value.

According to the training device with the aforementioned configuration, when the agent is performing a walking motion involving the relative motion between the upper body and the leg thereof, the forces can be made to apply to the agent in various behaviors, and the walking behavior can be made to approach the desired behavior.

The footstep can be calculated according to the leg length of the agent (preliminarily store in memory), the maximum positive leg angle $\phi$ and the maximum negative leg angle $\phi$. The walking frequency (steps per unit time) can be calculated according to a timing at which the left or the right legs steps on the floor. The timing can be obtained according to the walking cycle recognized according to a temporal variation pattern of the leg angle $\phi$ or a temporal variation pattern of output signals from an acceleration sensor for determining the vertical acceleration of the agent. The walking ratio is a ratio of the footstep to the walking frequency.

It is acceptable to control the phase difference of the phase of the torque F with respect to the leg angle $\phi$ to match the desired phase difference. In order to accomplish such control, the training device 1 may adopt a walking assist device (motion assist device or motion guide device) disclosed in Japan Patents No. 3930399, 3950149, 4008464, 4008465, 4220567, 4234765, 4271711 and 4271713, respectively.

In the walking assist device, the desired phase difference is automatically adjusted according to a mode selected by the agent through the interface 204.

(Phase Difference Control Method in Assist Mode)

The assist mode is accomplished by adjusting the desired phase difference to be equal to $(\pi/2)$ at a time point where at least the leg angle $\phi$ is of a maximum value $\phi_{max}$ and a time point where at least the leg angle $\phi$ is of a minimum value $\phi_{min}$, respectively (refer to FIG. 4).

At the timing where the leg angle $\phi$ is of the minimum value $\phi_{min}$ (translation time point from the second assist period to the third assist period), the phase difference of the torque F (F''>0) with respect to the leg angle $\phi$ is equal to $(\pi/2)$, the same as the desired phase difference. At the timing where the leg angle $\phi$ is of the maximum value $\phi_{max}$ (translation time point from the fourth assist period to the first assist period), the phase difference of the torque F (F'<0) with respect to the leg angle $\phi$ is equal to $(\pi/2)$, the same as the desired phase difference.

Since the desired phase difference is adjusted constantly to stay around $(\pi/2)$, the phase of the torque F is controlled to have a phase difference varying with respect to the leg angle $\phi$. At the timing where the torque F is of the minimum value $F_{min}$ (translation time point from the first assist period to the second assist period), the phase difference of the torque F with respect to the leg angle $\phi$ ($\phi<0$, $\phi'<0$) is roughly equal to $(\pi/2)(1-\alpha_1/\phi_{min})$. At the timing where the torque F is of the maximum value $F_{max}$ (translation time point from the third assist period to the fourth assist period), the phase difference of the torque F with respect to the leg angle $\phi$ ($\phi>0$, $\phi'>0$) is roughly equal to $(\pi/2)(1-\alpha_2/\phi_{max})$.

(Phase Difference Control Method in Training Mode)

The training mode is accomplished by adjusting the desired phase difference to be equal to $-(\pi/2)$ at a time point where at least the leg angle $\phi$ is of a maximum value $\phi_{max}$ and a time point where at least the leg angle $\phi$ is of a minimum value $\phi_{min}$, respectively (refer to FIG. 7).

At the timing where the leg angle $\phi$ is of the minimum value $\phi_{min}$ (translation time point from the second training period to the third training period), the phase difference of the torque F (F'<0) with respect to the leg angle $\phi$ is equal to $-(\pi/2)$, the same as the desired phase difference. At the timing where the leg angle $\phi$ is of the maximum value $\phi_{max}$ (translation time point from the fourth training period to the first training period), the phase difference of the torque F (F'>0) with respect to the leg angle $\phi$ is equal to $-(\pi/2)$, the same as the desired phase difference.

Since the desired phase difference is adjusted constantly to stay around $-(\pi/2)$, the phase of the torque F is controlled to have a phase difference varying with respect to the leg angle $\phi$. At the timing where the torque F is of the maximum value $F_{max}$ (translation time point from the first training period to the second training period), the phase difference of the torque F with respect to the leg angle $\phi$ ($\phi>0$, $\phi<0$) is roughly equal to $-(\pi/2)(1-\beta_1/\phi_{max})$. At the timing where the torque F is of the minimum value $F_{min}$ (translation time point from the third training period to the fourth training period), the phase difference of the torque F with respect to the leg angle $\phi$ ($\phi<0$, $\phi'>0$) is roughly equal to $-(\pi/2)(1-\beta_2/\phi_{min})$.

(Phase Difference Control Method in Hybrid Mode)

The hybrid mode is accomplished by adjusting the desired phase difference to be greater than $-(\pi/2)$ at a time point where the leg angle $\phi$ is of a maximum value $\phi_{max}$ and smaller than $(\pi/2)$ at a time point where the leg angle $\phi$ is of a minimum value $\phi_{min}$, respectively (refer to FIG. 10).

At the timing where the leg angle $\phi$ is of the maximum value $\phi_{max}$ (mid-time point of the second hybrid period), the phase difference of the torque F (F>0, F'<0) with respect to the leg angle $\phi$ is of a positive value greater than $-(\pi/2)$, the same as the desired phase difference. At the timing where the leg angle $\phi$ is of the minimum value $\phi_{min}$ (mid-time point of the fourth hybrid period), the phase difference of the torque F with respect to the leg angle $\phi$ is of a positive value smaller than $(\pi/2)$, the same as the desired phase difference.

Since the desired phase difference is adjusted constantly, the phase of the torque F is controlled to have a phase difference varying with respect to the leg angle $\phi$. At the timing where the torque F (F'>0) is of zero (translation time point from the fourth hybrid period to the first hybrid period), the phase difference of the torque F with respect to the leg angle $\phi$ ($\phi<0$, $\phi'>0$) is roughly equal to $(\pi/2)(1-\gamma_1/\phi_{min})$. At the timing where the torque F is of the maximum value $F_{max}$ (translation time point from the first hybrid period to the second hybrid period), the phase difference of the torque F with respect to the leg angle $\phi$ ($\phi>0$, $\phi'>0$) is roughly equal to $(\pi/2)(1-\gamma_2/\phi_{max}$. At the timing where the torque F (F'>0) is of zero (translation time point from the second hybrid period to the third hybrid period), the phase difference of the torque F with respect to the leg angle $\phi$ ($\phi>0$, $\phi'<0$) is roughly equal to $(\pi/2)(1-\gamma_3/\phi_{max})$. At the timing where the torque F is of the minimum value $F_{min}$ (translation time point from the third hybrid period to the fourth hybrid period), the phase difference of the torque F with respect to the leg angle $\phi$ ($\phi<0$, $\phi'<0$) is roughly equal to $(\pi/2)(1-\gamma_4/\phi_{min})$.

What is claimed is:

1. A training device which is provided with a first mounting element mounted to an upper body of an agent, a second mounting element mounted to a leg thereof, an actuator and a controller configured to control the actuator and is configured to transmit a force generated from the actuator to the agent via the first mounting element and the second mounting element, operating selectively in an assist mode configured to apply an assist force to a relative motion between the upper body and the leg of the agent and a training mode configured to apply a resistance force to the relative motion between the upper body and the leg of the agent,
wherein the controller is configured to determine the degree of fatigue of the agent and switch between the assist mode and the training mode according to the determination result.

2. The training device according to claim 1, wherein the controller is configured to apply the force generated from the actuator to the agent as either the assist force or the resistance force by controlling a phase difference of the force applied to the agent with respect to the posture variant denoting a relative posture of the leg with respect to the upper body of the agent.

3. The training device according to claim 1, wherein the controller is configured to determine whether the leg of the agent is a standing leg or a free leg, and to control the actuator to differentiate respectively the variation behaviors of the assist force and the resistance force according to the determination result.

4. The training device according to claim 3, wherein the controller is configured to control the actuator to increase the assist force and the resistance force when it is determined that the leg of the agent is the standing leg, such that the assist force and the resistance force is greater when it is determined that the leg of the agent is the standing leg than when it is determined that the leg of the agent is the free leg.

5. The training device according to claim 1, wherein the controller is configured to recognize a posture of a walking surface where the agent walks, and to control the actuator to differentiate respectively the variation behaviors of the assist force and the resistance force according to different recognition results.

6. The training device according to claim 5, wherein the controller is configured to control the actuator to increase the assist force when it is recognized that the posture of the walking surface is an ascending inclination posture greater than that when it is recognized that the posture of the walking surface is a flat posture or a descending inclination posture, and to control the actuator to increase the assist force when it is recognized that the posture of the walking surface is a flat posture greater than that when it is recognized that the posture of the walking surface is a descending inclination posture.

7. The training device according to claim 5, wherein the controller is configured to control the actuator to increase the resistance force when it is recognized that the posture of the walking surface is a descending inclination posture greater than that when it is recognized that the posture of the walking surface is a flat posture or an ascending inclination posture, and to control the actuator to increase the resistance force when it is recognized that the posture of the walking surface is a flat posture greater than that when it is recognized that the posture of the walking surface is an ascending inclination posture.

8. The training device according to claim 1, wherein the controller is configured to control the actuator to increase the assist force from zero continuously and return it back to zero thereafter from an initial time to an end time of the assist mode, and control the actuator to increase the resistance force from zero continuously and return it back to zero thereafter from an initial time to an end time of the training mode.

9. The training device according to claim 1 is further provided with a first interface configured to enable the agent to select one mode from the assist mode and the training mode, wherein the controller is configured to control the actuator according to the one mode of the assist mode and the training mode selected according to a signal output from the first interface corresponded to the selection by the agent.

10. The training device according to claim 1 is further provided with a second interface configured to enable the agent to select one mode as an operation mode from a plurality of assist modes with the assist force having different variation behaviors under identical conditions, wherein the controller is configured to control the actuator according to the one mode of the plurality of assist modes selected according to a signal output from the second interface corresponded to the selection by the agent.

11. The training device according to claim 1 is further provided with a third interface configured to enable the agent to select one mode as an operation mode from a plurality of training modes with the resistance force having different variation behaviors under identical conditions, wherein the controller is configured to control the actuator according to the one mode of the plurality of training modes selected according to a signal output from the third interface corresponded to the selection by the agent.

12. The training device according to claim 1, wherein
the actuator is provided with a motor and a reduction mechanism,
the assist force and the resistance force are transmitted respectively to the agent via an output shaft of the motor and the reduction mechanism, and
the controller is configured to adjust the assist force and the resistance force respectively through changing a reduction ratio of the reduction mechanism.

13. The training device according to claim 1, wherein the controller is configured to determine at least one of a walking cycle, a footstep, a walking frequency and a walking ratio of the agent as a walking state variant and control the actuator to match a determined value of the walking state variant with a desired value.

14. A training device which is provided with a first mounting element mounted to an upper body of an agent, a second mounting element mounted to a leg thereof, an actuator and a controller configured to control the actuator and is configured to transmit a force generated from the actuator to the agent via the first mounting element and the second mounting element, operating selectively in an assist mode configured to apply an assist force to a relative motion between the upper body and the leg of the agent and a training mode configured to apply a resistance force to the relative motion between the upper body and the leg of the agent,
wherein the controller is configured to adjust the assist force and the resistance force as a function with a part of or the entire part of a posture variant denoting a relative posture of the leg with respect to the upper body of the agent and a temporal differential thereof served as a variant of the function, and wherein the controller is configured to control the assist force according to a function having a variation property of approaching to zero as the posture variant approaches to the variant maximum value and approaching to the function minimum value as the posture variant approaches to a first assist reference value in a first assist domain satisfying conditions that the posture variant is equal to or greater than the first assist reference value, a posture variation velocity which is a first-order temporal differential of the posture variant is negative, and the posture variation velocity approaches to zero as the posture variant approaches to the variant maximum value, control the assist force according to the function having a variation property of approaching to zero as the posture variant approaches to the variant minimum value and approaching to the function minimum value as the posture variant approaches to the first assist reference value in a second assist domain satisfying conditions that the posture variant is smaller than the first assist reference value, the posture variation velocity is negative, and the posture variation velocity approaches to zero as the posture variant approaches to the variant minimum value, control the assist force according to the function having a variation property of approaching to zero as the posture variant approaches to the variant minimum value and approaching to the function maximum value as the posture variant approaches to a second assist reference value in a third assist domain satisfying conditions that the posture variant is smaller than the second assist reference value, the posture variation velocity is positive, and the posture variation velocity approaches to zero as the posture variant approaches to the variant minimum value, and control the assist force according to the function having a variation property of approaching to zero as the posture variant approaches to the variant maximum value and approaching to the function maximum value as the posture variant approaches to the second assist reference value in a fourth assist domain satisfying conditions that the posture variant is equal to or greater than the second assist reference value, the posture variation velocity is positive, and the posture variation velocity approaches to zero as the posture variant approaches to the variant maximum value.

15. The training device according to claim 14, wherein the controller is configured to control the assist force by the usage of an approximate expression of a curved line denoting the variation behavior of the assist force in a plane defined by the assist force and the posture variant, and determined values of the posture variant and the posture variation velocity.

16. The training device which is provided with a first mounting element mounted to an upper body of an agent, a second mounting element mounted to a leg thereof, an actuator and a controller configured to control the actuator and is configured to transmit a force generated from the actuator to the agent via the first mounting element and the second mounting element, operating selectively in an assist mode configured to apply an assist force to a relative motion between the upper body and the leg of the agent and a training mode configured to apply a resistance force to the relative motion between the upper body and the leg of the agent, wherein the controller is configured to adjust the assist force and the resistance force as a function with a part of or the entire part of a posture variant denoting a relative posture of the leg with respect to the upper body of the agent and a temporal differential thereof served as a variant of the function, and wherein the controller is configured to control the resistance force according to a function having a variation property of approaching to zero as the posture variant approaches to the variant maximum value and approaching to the function maximum value as the posture variant approaches to a first training reference value in a first training domain satisfying conditions that the posture variant is equal to or greater than the first training reference value, the posture variation velocity which is a first-order temporal differential of the posture variant is negative, and the posture variation velocity approaches to zero as the posture variant approaches to the variant maximum value, control the resistance force according to the function having a variation property of approaching to zero as the posture variant approaches to the variant minimum value and approaching to the function maximum value as the posture variant approaches to the first training reference value in a second training domain satisfying conditions that the posture variant is smaller than the first training reference value, the posture variation velocity is negative, and the posture variation velocity approaches to zero as the posture variant approaches to the variant minimum value, control the resistance force according to the function having a variation property of approaching to zero as the posture variant approaches to the variant minimum value and approaching to the function minimum value as the posture variant approaches to a second training reference value in a third training domain satisfying conditions that the posture variant is smaller than the second training reference value, the posture variation velocity is positive, and the posture variation velocity approaches to zero as the posture variant approaches to the variant minimum value, and control the resistance force according to the function having a variation property of approaching to zero as the posture variant approaches to the variant maximum value and approaching to the function minimum value as the posture variant approaches to the second training reference value in a fourth training domain satisfying conditions that the posture variant is equal to or greater than the second training reference value, the posture variation velocity is positive, and the posture variation velocity approaches to zero as the posture variant approaches to the variant maximum value.

17. The training device according to claim 16, wherein the controller is configured to control the resistance force by the usage of an approximate expression of a curved line denoting the variation behavior of the resistance force in a plane defined by the resistance force and the posture variant, and determined values of the posture variant and the posture variation velocity.

18. A training device is provided with a first mounting element mounted to an upper body of an agent, a second mounting element mounted to a leg thereof, an actuator and a controller configured to control the actuator and is configured to transmit a force generated from the actuator to the agent via the first mounting element and the second mounting element, operating selectively in an assist mode configured to apply an assist force to a relative motion between the upper body and the leg of the agent and a training mode configured to apply a resistance force to the relative motion between the upper body and the leg of the agent, the training device further provided with an electric energy storing system, wherein the actuator is provided with a motor, the resistance force is transmitted to the agent via regenerative braking or friction of the motor, and the electric energy generated from the regenerative braking of the motor is stored in the electric energy storing system.

19. The training device according to claim 18 is further provided with a connection terminal for supplying electric energy to an external electronic equipment from the electric energy storing system.

20. A training device which is provided with a first mounting element mounted to an upper body of an agent, a second mounting element mounted to a leg thereof, an actuator and a controller configured to control the actuator and is configured to transmit a force generated from the actuator to the agent via the first mounting element and the second mounting element, operating according to a hybrid mode mixed with an assist period in which an assist force is applied to a relative motion between the upper body and the leg of the agent and a training period in which a resistance force is applied to the relative motion between the upper body and the leg of the agent, wherein the controller is configured to recognize a posture of a walking surface where the agent walks, and to control the actuator to differentiate respectively the variation behaviors of the assist force and the resistance force according to different recognition results.

21. The training device according to claim 20, wherein the controller is configured to adjust at least one of the assist force and the resistance force as a function with a part of or the entire part of a posture variant denoting a relative posture of the leg with respect to the upper body of the agent and a temporal differential thereof served as a variant of the function.

22. The training device according to claim 21, wherein the controller is configured to control the assist force according to a function having a variation property of approaching to zero as the posture variant approaches to a first hybrid reference value and approaching to the function maximum value as the posture variant approaches to a second hybrid reference value in a first hybrid domain satisfying conditions that the posture variant is equal to or greater than the first hybrid reference value but smaller than the second hybrid reference value, and a posture variation velocity which is a first-order temporal differential of the posture variant is positive, control the assist force according to the function having a variation property of approaching to the function maximum value as the posture variant approaches to the second hybrid reference value in a first assist domain satisfying conditions that the posture variant is equal to or greater than the second hybrid reference value and the posture variation velocity is positive and control the resistance force according to the function having a variation property of approaching to zero as the posture variant approaches to a third hybrid reference value in a first training domain satisfying conditions that the posture variant is equal to or greater than the third hybrid reference value and the posture variation velocity is negative, wherein the first assist domain and the first training domain are contained in a second hybrid domain, control the assist force according to the function having a variation property of approaching to zero as the posture variant approaches to the third hybrid reference value and approaching to the function minimum value as the posture variant approaches to a fourth hybrid reference value in a third hybrid domain satisfying conditions that the posture variant is equal to or greater than the fourth hybrid reference value but smaller than the third hybrid reference value, and the posture variation velocity is negative, and control the assist force according to the function having a variation property of approaching to the function minimum value as the posture variant approaches to the fourth hybrid reference value in a second assist domain satisfying conditions that the posture variant is smaller than the fourth hybrid reference value and the posture variation velocity is negative and control the resistance force according to the function having a variation property of approaching to zero as the posture variant approaches to the first hybrid reference value in a second training domain satisfying conditions that the posture variant is smaller than the first hybrid reference value and the posture variation velocity is positive, wherein the second assist domain and the second training domain are contained in a fourth hybrid domain.

23. The training device according to claim 22, wherein the controller is configured to control the assist force and the resistance force respectively by the usage of an approximate expression of a curved line denoting the variation behavior of a force applied to the agent by the actuator in a plane defined by the force and the posture variant, and determined values of the posture variant and the posture variation velocity.

24. The training device according to claim 20, wherein the controller is configured to control the actuator to operate selectively in an assist mode configured to apply constantly an assist force to a relative motion between the upper body and the leg of the agent, a training mode configured to apply constantly a resistance force to the relative motion between the upper body and the leg of the agent, and the hybrid mode.

25. The training device according to claim 24 is further provided with a first interface configured to enable the agent to select one mode from the assist mode, the training mode and the hybrid mode, wherein the controller is configured to control the actuator according to the one mode of the assist mode, the training mode and the hybrid mode selected according to a signal output from the first interface corresponded to the selection by the agent.

26. The training device according to claim 20 is further provided with a second interface configured to enable the agent to select one mode as an operation mode from a plurality of hybrid modes with the assist mode and the training mode mixed with different rates under identical conditions, wherein the controller is configured to control the actuator according to the one mode of the plurality of hybrid modes selected according to a signal output from the second interface corresponded to the selection by the agent.

27. The training device according to claim 20, wherein the controller is configured to apply the force generated from the actuator to the agent as either the assist force or the resistance force by controlling a phase difference of the force applied to the agent with respect to the posture variant denoting a relative posture of the leg with respect to the upper body of the agent.

28. The training device according to claim 20, wherein the controller is configured to determine whether the leg of the agent is a standing leg or a free leg, and to control the actuator to differentiate respectively the variation behaviors of the assist force and the resistance force according to the determination result.

29. The training device according to claim 28, wherein the controller is configured to control the actuator to increase the assist force and the resistance force when it is determined that the leg of the agent is the standing leg, such that the assist force and the resistance force is greater when it is determined that the leg of the agent is the standing leg than when it is determined that the leg of the agent is the free leg.

30. The training device according to claim 20, wherein the controller is configured to control the actuator to increase the assist force when it is recognized that the posture of the walking surface is an ascending inclination posture greater than that when it is recognized that the posture of the walking surface is a flat posture or a descending inclination posture, and to control the actuator to increase the assist force when it is recognized that the posture of the walking surface is a flat posture greater than that when it is recognized that the posture of the walking surface is a descending inclination posture.

31. The training device according to claim 20, wherein the controller is configured to control the actuator to increase the resistance force when it is recognized that the posture of the walking surface is a descending inclination posture greater than that when it is recognized that the posture of the walking surface is a flat posture or an ascending inclination posture, and to control the actuator to increase the resistance force when it is recognized that the posture of the walking surface is a flat posture greater than that when it is recognized that the posture of the walking surface is an ascending inclination posture.

32. The training device according to claim 20, wherein
the actuator is provided with a motor and a reduction mechanism,
the assist force and the resistance force are transmitted respectively to the agent via an output shaft of the motor and the reduction mechanism, and
the controller is configured to adjust the assist force and the resistance force respectively through changing a reduction ratio of the reduction mechanism.

33. The training device according to claim 20 is further provided with an electric energy storing system, wherein
the actuator is provided with a motor,
the resistance force is transmitted to the agent via regenerative braking or friction of the motor, and
the electric energy generated from the regenerative braking of the motor is stored in the electric energy storing system.

34. The training device according to claim 33 is further provided with a connection terminal for supplying electric energy to an external electronic equipment from the electric energy storing system.

35. The training device according to claim 20, wherein the controller is configured to determine at least one of a walking cycle, a footstep, a walking frequency and a walking ratio of the agent as a walking state variant and control the actuator to match a determined value of the walking state variant with a desired value.

36. A training device which is provided with a first mounting element mounted to an upper body of an agent, a second mounting element mounted to a leg thereof, an actuator and a controller configured to control the actuator and is configured to transmit a force generated from the actuator to the agent via the first mounting element and the second mounting element, operating according to a hybrid mode mixed with an assist period in which an assist force is applied to a relative motion between the upper body and the leg of the agent and a training period in which a resistance force is applied to the relative motion between the upper body and the leg of the agent,
the controller is configured to control the actuator to operate selectively in an assist mode configured to apply constantly an assist force to a relative motion between the upper body and the leg of the agent, a training mode configured to apply constantly a resistance force to the relative motion between the upper body and the leg of the agent, and the hybrid mode, and
wherein the controller is configured to determine the degree of fatigue of the agent and switch among the assist mode, the training mode and the hybrid mode according to the determination result.

37. A training device which is provided with a first mounting element mounted to an upper body of an agent, a second mounting element mounted to a leg thereof, an actuator and a controller configured to control the actuator and is configured to transmit a force generated from the actuator to the agent via the first mounting element and the second mounting element is further provided with an electric energy storing system, wherein
the actuator is provided with a motor,
a resistance force is applied to a relative motion between the upper body and the leg of the agent via regenerative braking of the motor,
the controller is configured to adjust the resistance force as a function with a part of or the entire part of a posture variant denoting a relative posture of the leg with respect to the upper body of the agent and a temporal differential thereof served as a variant of the function, and
the electric energy generated from the regenerative braking of the motor is stored in the electric energy storing system.

38. The training device according to claim 37, wherein the controller is configured to determine whether the leg of the agent is a standing leg or a free leg, and to control the actuator to differentiate a variation behavior of the resistance force according to the determination result.

39. The training device according to claim 38, wherein the controller is configured to control the actuator to increase the resistance force when it is determined that the leg of the agent is the standing leg, such that the resistance force is greater when it is determined that the leg of the agent is the standing leg than when it is determined that the leg of the agent is the free leg.

40. The training device according to claim 37, wherein the controller is configured to recognize a posture of a walking surface where the agent walks, and to control the actuator to differentiate the variation behavior of the resistance force according to different recognition results.

41. The training device according to claim 40, wherein the controller is configured to control the actuator to increase the resistance force when it is recognized that the posture of the walking surface is a descending inclination posture greater than that when it is recognized that the posture of the walking surface is a flat posture or an ascending inclination posture, and to control the actuator to increase the resistance force when it is recognized that the posture of the walking surface is a flat posture greater than that when it is recognized that the posture of the walking surface is an ascending inclination posture.

42. The training device according to claim 37 is further provided with a connection terminal for supplying electric energy to an external electronic equipment from the electric energy storing system.

* * * * *